US012201051B2

(12) United States Patent
Cromer

(10) Patent No.: US 12,201,051 B2
(45) Date of Patent: Jan. 21, 2025

(54) APPARATUS AND METHOD FOR SEED GERMINATION AND PLANTING

(71) Applicant: Walter A. Cromer, Knoxville, TN (US)

(72) Inventor: Walter A. Cromer, Knoxville, TN (US)

(73) Assignee: Eden Concepts, LLC, Knoxville, TN (US)

( * ) Notice: Subject to any disclaimer, the term of this patent is extended or adjusted under 35 U.S.C. 154(b) by 35 days.

(21) Appl. No.: 17/988,831

(22) Filed: Nov. 17, 2022

(65) Prior Publication Data

US 2023/0247931 A1 Aug. 10, 2023

Related U.S. Application Data

(60) Provisional application No. 63/290,745, filed on Dec. 17, 2021.

(51) Int. Cl.

*A01C 1/04* (2006.01)
*A01C 7/00* (2006.01)
*A01C 7/10* (2006.01)

(52) U.S. Cl.

CPC ................ *A01C 1/04* (2013.01); *A01C 7/004* (2013.01); *A01C 7/105* (2013.01)

(58) Field of Classification Search

CPC ........ A01G 9/0293; A01G 9/085; A01C 7/04; A01C 7/042; A01C 7/20; A01C 7/206; A01C 1/04; A01C 7/105; A01C 7/004

USPC ..................................... 47/59 S, 58.1 SE, 56

See application file for complete search history.

(56) References Cited

U.S. PATENT DOCUMENTS 3,322,080 A 5/1967 Gatzke et al.
3,770,164 A * 11/1973 Hembree .............. A01C 7/044 221/211
4,037,755 A * 7/1977 Reuter .................. A01C 7/044 111/179

(Continued)

FOREIGN PATENT DOCUMENTS

CN 111034426 A * 4/2020
EP 2674019 A1 12/2013

(Continued)

OTHER PUBLICATIONS

Searcy, S. W., and L. O. Roth (1982) "Spatial Distribution of Fluid Drilled Seeds" Trans. ASAE 1982:1560-62.

(Continued)

*Primary Examiner* — Tien Q Dinh
*Assistant Examiner* — Kevin M Dennis
(74) *Attorney, Agent, or Firm* — Robert J. Lauf

(57) ABSTRACT

Systems and methods for seed germination and planting include: a germinator unit providing an environment for seeds to germinate in water, and means to deliver the germinated seeds in batch form, suspended in an aqueous hydrogel; and a planting unit to accept batches of suspended seeds and dispense the seeds, preferably in singulated manner, to selected locations in a planting environment. The planting unit may be man-portable, mounted on a trailer or autonomous vehicle, or substantially stationary for use in a greenhouse. The planting environment may be a field or it may be a planting tray, pot, or other container for use in a greenhouse.

14 Claims, 15 Drawing Sheets

(56) References Cited

U.S. PATENT DOCUMENTS 4,155,314 A * 5/1979 O'Callaghan .......... A01C 7/004 47/9
4,224,882 A 9/1980 Cruse
4,544,082 A * 10/1985 Becker .................. A01C 7/042 221/200
4,898,108 A 2/1990 McDermott
4,970,973 A * 11/1990 Lyle ...................... A01C 5/062 172/26
5,570,813 A * 11/1996 Clark, II .................. F16N 7/30 222/394
5,873,197 A * 2/1999 Rowse .................... A01C 1/02 47/16
5,936,234 A * 8/1999 Thomas .................. G01V 8/16 250/222.2
5,964,403 A * 10/1999 Miller .................... B05B 12/12 239/69
6,516,271 B2 2/2003 Upadhyaya et al.
6,710,874 B2 * 3/2004 Mavliev ............. G01N 15/1459 356/336
6,718,891 B1 * 4/2004 Burbage, Jr. .......... A01C 7/088 111/177
11,229,876 B1 * 1/2022 Eastin .................. B01D 53/508
2006/0231000 A1 * 10/2006 Eastin .................. C08B 37/003 111/200
2008/0216404 A1 * 9/2008 Jarvis ...................... A01G 2/10 47/59 R
2009/0241817 A1 * 10/2009 Eastin ................ A01M 7/0092 239/8
2011/0138690 A1 * 6/2011 Singletary ............. A01G 24/35 47/59 S
2021/0185895 A1 * 6/2021 Johnson ................ A01C 7/163

FOREIGN PATENT DOCUMENTS

EP 3695696 A1 * 8/2020
WO WO-2006113688 A2 * 10/2006 ............... A01C 1/04
WO WO-2021019331 A1 * 2/2021 ............... A01C 7/06

OTHER PUBLICATIONS

Searcy, S. W., and L. O. Roth (1982) "Precision Metering of Fluid Drilled Seeds" Trans. ASAE 1982:1563-66.

Willenbacher, N. (1996) "Unusual Thixotropic Properties of Aqueous Dispersions of Laponite RD" Journal of Collodial and Interface Science 182, 501-510.

* cited by examiner

APPARATUS AND METHOD FOR SEED GERMINATION AND PLANTING

CROSS-REFERENCE TO RELATED APPLICATION

This application claims the benefit of Provisional Patent Application No. 63/290,745 filed on Dec. 17, 2021 by the present inventor, the entire disclosure of which is incorporated herein by reference.

STATEMENT REGARDING FEDERALLY SPONSORED RESEARCH

The United States Government has rights in this invention pursuant to contract No. 2020-33610-32054 between the United States Department of Agriculture and Eden Concepts LLC.

BACKGROUND OF THE INVENTION

Field of the Invention

The invention pertains to apparatus and methods for starting and planting seeds. More particularly, the invention pertains to methods for automated germination and singulation of germinated seeds.

Description of Related Art

Many horticultural and food crops are typically grown from seed. Although some crops, e.g., corn, soybeans, and cereal grains are normally sown as dry seed, other crops, e.g., tomatoes, peppers, and lettuce, as well as many flowers, are typically germinated in small pots or compartmented trays and then transplanted into the ground when they are of sufficient size. Other crops may be germinated in water and then mixed into a gel suspension, which is then placed dropwise into the planting medium or field, a practice known as fluid drilling.

In greenhouse grown lettuce, the overall productivity in crops per year is less than optimal because when one crop is harvested, eight days are needed for germination of the next crop, and during that time the growing space is essentially idle.

Many horticultural and food crops have less than 100% germination rate and consequently growing space is consumed by non-viable seeds that require investment to remove, yielding less than optimal production.

U.S. Pat. No. 5,570,813 describes a system that uses the pressure of an inert gas to provide the motive force to cause a viscous fluid out of a canister. U.S. Pat. No. 5,964,403 describes an automatically electronically controlled microsprayer that claims to dispense a precise amount of a liquid by controlling the timing of the pulse of spray. U.S. Pat. No. 5,873,197 describes seed priming apparatus and method for germinating seeds up the point of radicle emergence. U.S. Pat. No. 6,710,874 describes a method and apparatus for detecting individual particles in a flowable sample.

Multiple U.S. patents describe methods and apparatus for counting seeds in a planting device. U.S. Pat. No. 5,936,234 is one example. U.S. Pat. No. 6,516,271 describes a method and system for generating a centimeter accuracy map of the location of seeds or vegetation as they are planted from an agricultural planting machine.

Other U.S. patents discuss related methods and systems. Patents for seed singulator methods and apparatus generally focus on dry seeds; U.S. Pat. Nos. 4,898,108, 3,770,164 are examples. U.S. Pat. No. 4,181,241 describes a method and apparatus for dispensing seeds from a liquid suspension in a container. U.S. Pat. No. 4,224,882 describes an apparatus for sowing seeds in a suspension. However, the apparatus does not singulate the extruded seeds to ensure a uniform and precise seed separation.

Searcy and Roth reviewed the status of techniques for planting pre-germinated seeds (fluid drilling), and in particular studied the development of a precision metering system for pre-germinated seeds [Searcy, S. W., and L. O. Roth, Trans. ASAE 1982:1560-62 and 1563-66]. This work focused only on metering germinated seeds and did not explore approaches or systems for germinating the seeds. Searcy and Roth noted the importance of using a gelling material to protect the germinated seed from damage and hold them in a suspension. They studied two potential commercially available materials and settled on a polyacrylamide-based organic material, Viterra II, for its balance of viscosity, seed suspension, and optical qualities. Their system used continuous air pressure to cause the seed-gel mixture to flow but relied on a rotating disk to stop the flow the way a gate valve works. The disk rotated openings in line with the pipe when the flow was wanted and rotated to a solid section of the disk to stop the material flow. According to the authors, "In order to retain the even spacing of seeds achieved by the metering mechanism, a continuous flow of gel was maintained to the furrow. An intermittent gel flow would have had the advantage of limiting gel needs but was not used due to the difficulty in controlling the quantity of gel being released at the end of the tube. The flow at both the transfer point and from the seed-gel tank was intermittent and controlled by the rotation of the input disk. The input disk had half as many cells as the output disk and rotated in two steps. The first step trapped a seed in a cell and stopped gel flow at both the input and transfer points. The second step realigned the cells with the input and transfer points, initiating a transfer to the output disk and input of another seed." In essence, his approach relied on an intrusive, mechanical method to control the flow. Searcy and Roth did not disclose any bellows, gaskets, or other devices between disks or pipe outlets that would ensure alignment and prevent seed damage or fluid leakage.

What is needed, therefore, is a system that will enable seeds to be germinated in a more compact location and then placed in the final growing location and medium, whether indoors or outdoors, and thereby increase the availability of such locations and media for growing plants, lower energy, labor and other costs for indoor growing, and enable growing season extension and other improvements.

Objects and Advantages

Objects of the present invention include the following: providing an apparatus to germinate a large number of seeds in a compact space; providing an apparatus that can be programmed to make germinated seeds available for planting at a selected time; providing an apparatus for dispensing singulated, germinated seeds for planting; providing methods for handling seeds and seedlings in a viscous fluid carrier; providing an apparatus for providing status and other information to the operator during the process; providing apparatus for detecting seeds in a flowing medium; providing apparatus to store germinated seeds temporarily until ready to plant; providing an apparatus for dispensing germinated seeds individually at selected intervals in a planting environment; providing an apparatus for documenting location of planted seeds, and providing a method for cleaning and sanitizing all components between each batch of seeds processed. These and other objects and advantages of the invention will become apparent from consideration of the following specification, read in conjunction with the drawings.

SUMMARY OF THE INVENTION

According to one aspect of the invention, an apparatus for seed processing comprises:

- a closed container containing a plurality of seeds spaced apart from one another in a seed germinating medium;
- an optical detection device for detecting germinated seeds, optionally, a means of separating germinated and ungerminated seeds prior to planting;
- a means for spacing seed uniformly;
- a mechanical planting device to sequentially eject the spaced-apart seeds and seed germinating medium after germination so that each seed is deposited into growing medium at a selected location for further growth; and,
- a control system to allow a user to input process control information and inform the user of the progress of the process.

According to another aspect of the invention, a method for seed processing comprises the steps of:

- providing a container with a selected quantity of water and a selected quantity of seeds;
- placing the container in a thermal environment conducive to germination;
- optionally, holding the germinated seeds in storage temporarily;
- after the seeds have germinated, adding a gelling agent to the water-seed mixture to form a suspension of seeds in a thixotropic fluid;
- placing the suspended seeds and fluid in a mechanical planting device; and,
- using the mechanical planting device to singulate the spaced-apart germinated seeds and deposit discrete volumes of fluid, each volume containing a single seed, into a planting medium at selected locations for further growth.

According to another aspect of the invention, an apparatus for seed processing comprises:

- a closed container containing a plurality of seeds spaced apart from one another in a seed germinating medium;
- a means of controlling the temperature of the seed germinating medium;
- a control system that allows a user to input batch data and process parameters for a particular batch of seeds and provides output data on the particular batch to a planting device.

According to another aspect of the invention, an apparatus for seed processing comprises:

- a germination apparatus;
- a planting apparatus; and,
- a system for transferring pre-germinated seeds between the germination and
- planting apparatus without contamination of the mixture, the system comprising:
- fluid handling conduits, flow control devices, valves, pumps, compressors, and sensors.

According to another aspect of the invention, an apparatus for seed planting comprises:

- a container for holding a selected quantity of germinated seeds suspended in a thixotropic hydrogel fluid;
- a source of compressed air;
- a source of vacuum;
- a fluid conduit through which the seeds and hydrogel pass so that seeds become singulated from one another within the fluid stream;
- a first sensor to detect optically the passage of the singulated seeds within the fluid conduit;
- a second sensor to detect electrically the flow conditions within the fluid conduit;
- an outlet though which the singulated seeds, each with a quantity of surrounding hydrogel, are discharged at selected points in a planting medium; and,
- a control system to control the sources of compressed air and vacuum, monitor the outputs of the first and second sensors, and provide information to a user interface device.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore non-limiting embodiments illustrated in the drawing figures, wherein like numerals (if they occur in more than one view) designate the same elements. The features in the drawings are not necessarily drawn to scale.

FIG. 5A presents an oblique view from above, and FIG. 5B presents an oblique view from below.

FIG. 8A shows a plan view of a tape for holding seeds. FIG. 8B shows a cross sectional view of a closed tape containing a seed.

DETAILED DESCRIPTION OF THE INVENTION

Figure 1:
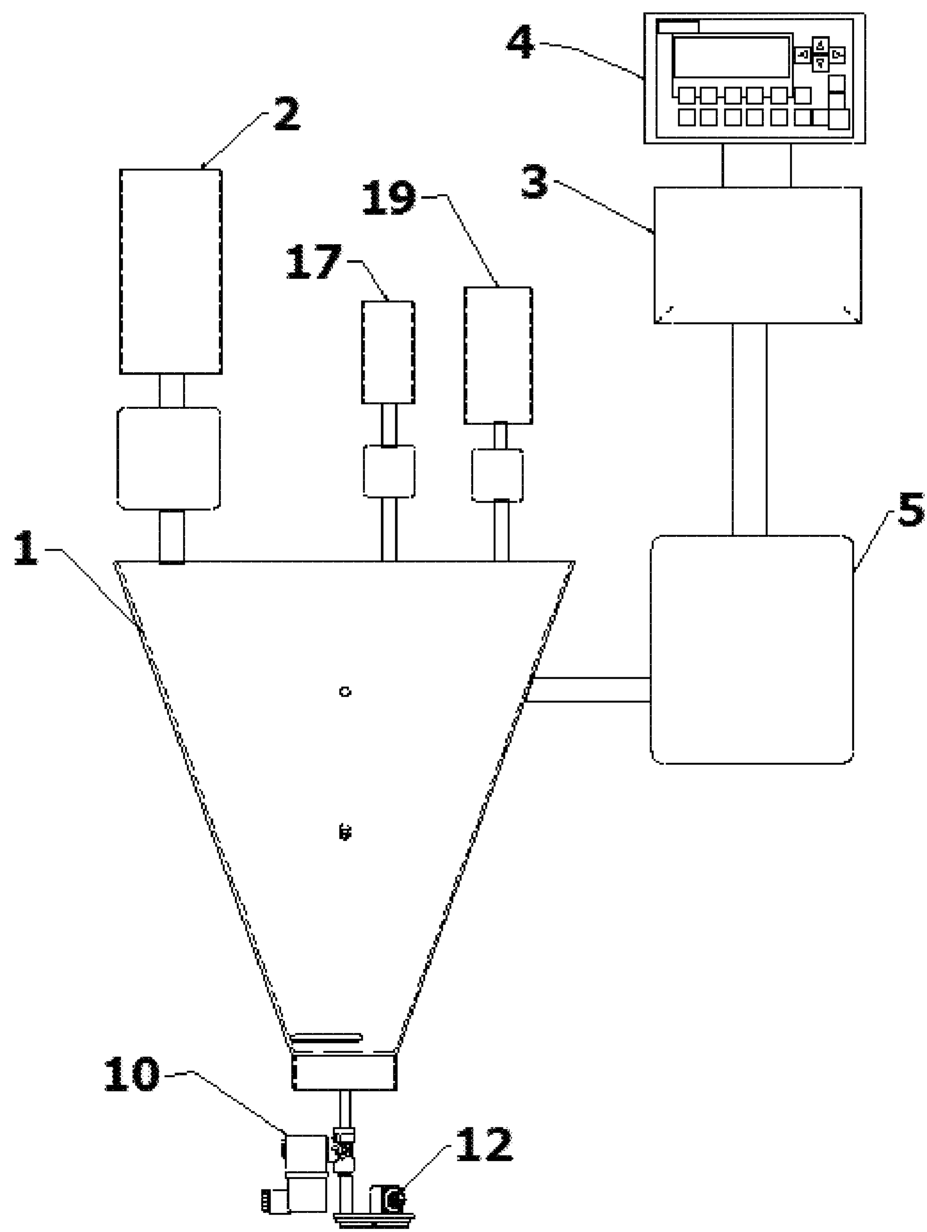
FIG. 1 is a schematic diagram of one example of a seed germination apparatus in accordance with some aspects of the invention.

The invention provides methods and associated apparatus that will enable seeds to be germinated in a more compact location and then placed in the final growing location and medium, whether indoors or outdoors, and thereby increase the availability of such locations and media for growing plants, lower energy, labor and other costs for indoor and outdoor growing, extend the growing season, and other improvements as may be determined by the user through routine experimentation.

The invention generally combines dry plant seeds with water that will allow the seed to germinate and sustain life within a relatively compact unit until planting can be accomplished. The germinated seeds and water are then combined with a gelling agent that will form a thixotropic aqueous suspension suitable for use in an automated planter. For convenience in shipping, storage, or sale, the apparatus may also be accompanied by premeasured packs of dry seed and dry material gel forming material that when mixed with a premeasured quantity of water by an end user will create the viscous solution or gel.

The invention includes several inter-related systems, devices, and methods:

First, a germination system receives seeds, water, and air. It provides an environment conducive to germination and a process controller may include one or more of the following functions:

1. Metering of water and/or seeds into a closed vessel;
2. Maintaining a selected temperature;
3. Stirring and/or aerating the fluid;
4. Metering and mixing a selected amount of gel-forming material into the water;
5. Transferring the seed-containing gel to a planting device;
6. Detecting and/or quantifying selected characteristics of the seed-gel mixture; and,
7. Transferring these characteristics to a planting device as operational inputs.

Second, a planting system receives a hydrogel-seed mixture from the germinating system and dispenses individual seeds at user-selected points in a growing environment. The planting system controller may include one or more of the following functions:

1. Receiving a thixotropic fluid-seed mixture from the germination system;
2. Receiving data on batch characteristics from the germination system;
3. Controlling the flow of the fluid-seed mixture;
4. Detecting and singulating individual seeds so that individual seeds can be dispensed reliably on demand;
5. Detecting bubbles in the fluid and differentiating them from seeds;
6. Detecting and controlling, in real time or near real time, the effective fluid velocity of the fluid-seed mixture;
7. Applying machine learning algorithms to adapt to changing characteristics of the fluid-seed mixture and/or the external environment; and,
8. Controlling the prime mover if the planter is part of an autonomous vehicle system.

The planting system may be configured for several different operational scenarios:

1. The planter may be a man-portable "backpack" system that receives a batch of seed mixture and is carried into the field by a user, who manually dispenses individual seeds (each contained in a small volume of fluid) at selected locations along a planting row;
2. The man-portable apparatus may alternatively be fixed to a wheeled cart and pushed or pulled by a user when planting;
3. The planter may be mounted on an autonomous vehicle that receives a batch of seed mixture and travels along a predetermined route in a field, dispensing individual seeds at selected locations; and,
4. The planter may be adapted to plant individual seeds in individual cells in a growing tray.

Germination System

As previously noted, the germination system receives seeds, water, and, after the seeds have germinated, a viscosity-modifying additive (in many cases this will be a gel-forming material) and provides an environment conducive to germination. The system is generally contemplated to operate in a batch mode, in which seeds and water are incubated for a selected time, then the viscosity modifier is added to suspend the seeds, and then the seed suspension transferred to the planting system. The germinating system is then cleaned and another batch of seeds is introduced. Various aspects of the germination system are described in the following examples.

Example

Figure 12:
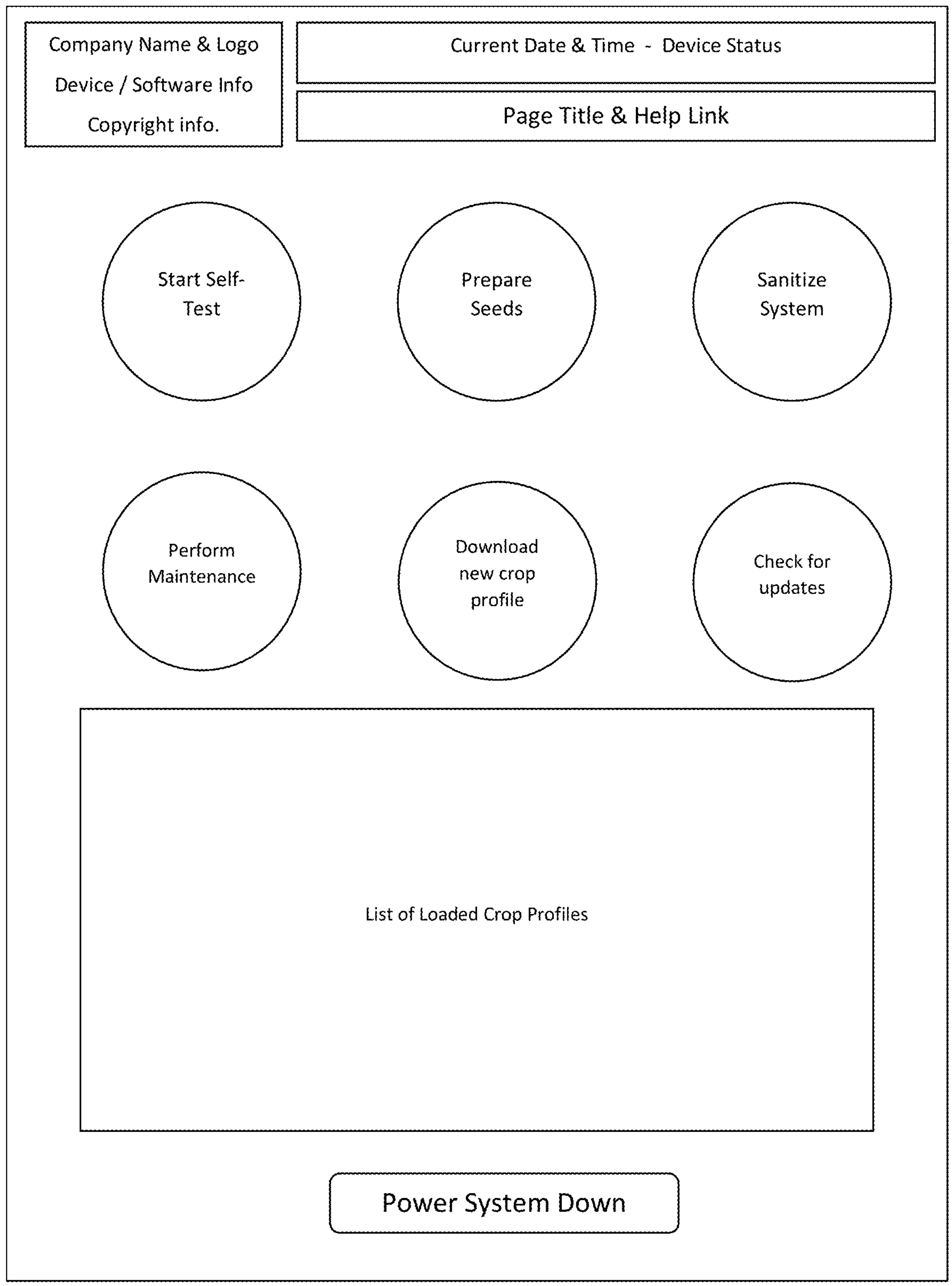
FIG. 12 is a schematic illustration of an exemplary version of a germination system user interface.
Figure 13:
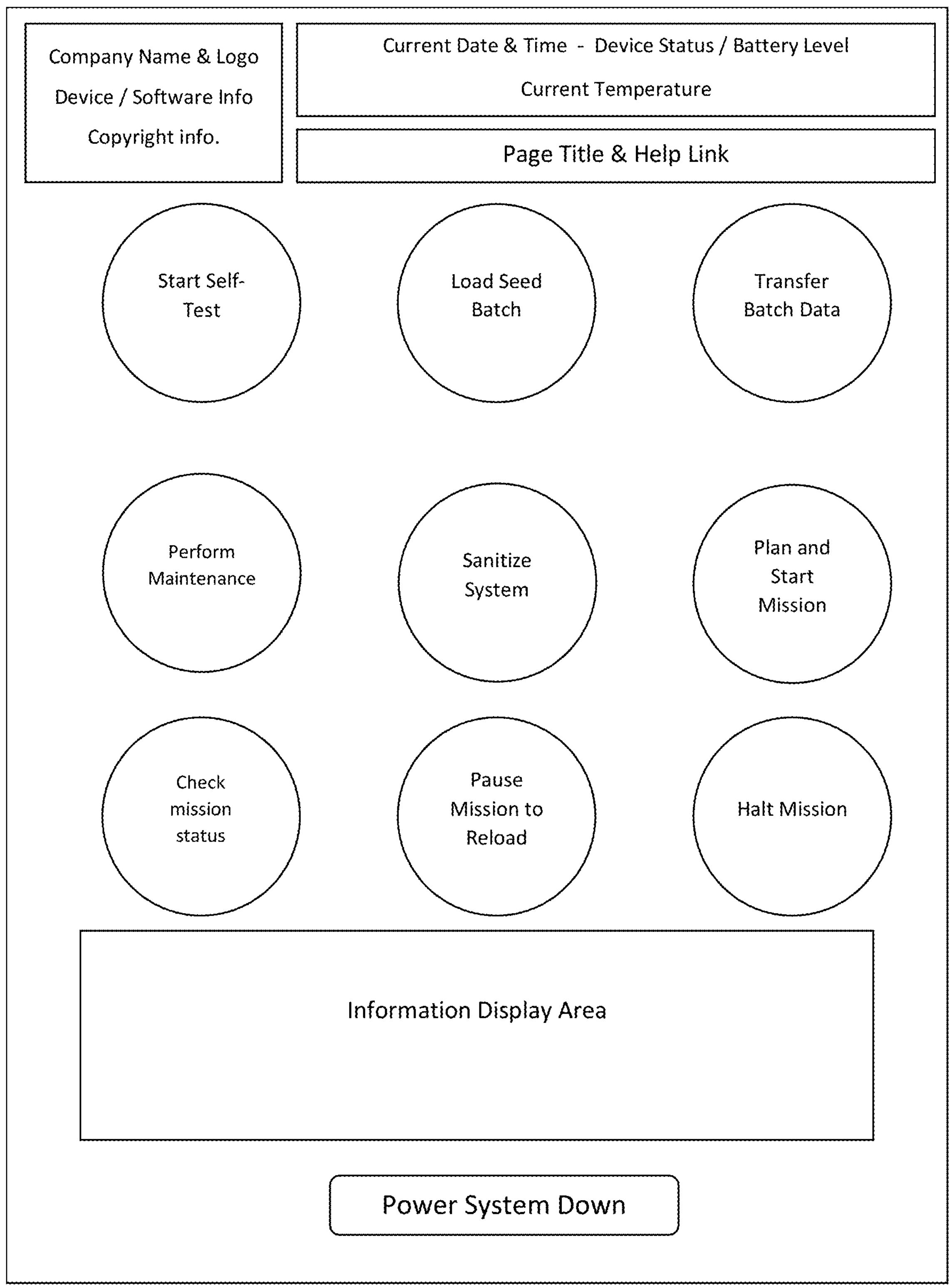
FIG. 13 is a schematic illustration of an exemplary version of a planter user interface.

As shown generally in FIG. 1, the invention combines dry plant seeds held in container 2 with water in container 1. A microcontroller 3 includes a user interface and a programmable logic device that controls such functions as time, temperature, aeration, agitation, etc., as are familiar in the art of process control. The operator enters the crop type, desired seed amount, and other information via user interface 4. (Two examples of user interface selections are shown in FIGS. 12-13.) It will be appreciated that the user interface 4 may be hardwired to the microcontroller or otherwise integral to the apparatus; however, it may alternatively take the form of an application running on a mobile device such as a laptop or tablet computer or a smart phone. The microcontroller 3 may communicate wirelessly with such mobile devices using any suitable communication protocol as are familiar in the industry, such as Wi-Fi, Bluetooth, ZigBee, 802.11b, and others. Microcontroller 3 receives inputs from various pressure, temperature, level and other sensors and commands valves and other electromechanical accessories 5 at appropriate points in the process to add, drain, and refresh water, aeration, incorporate gelling additive 17 and other additives 19 such as nutrients, fungicides, etc., and controls AC or DC input power for heating and other operations as may be applicable and desirable for the optimal growth of the seed. Microcontroller 3 updates the operator through suitable communication methods, such as those previously mentioned. Aeration may be provided through an aeration stone or other suitable aeration material (not shown) in container 1. Agitation and other mixing motion may be provided by a motor-driven mixer (not shown) also in container 1. The addition of the gelling additive after germination produces a viscous, preferably thixotropic, solution or hydrogel that will allow the seeds to be transferred without damage to the delicate emerging plant structures and sustain life within a relatively compact unit until planting can be accomplished. The microcontroller 3 also reads data from temperature sensor(s), pressure sensor(s), and/or other familiar sensor devices as may be desirable or necessary depending on the particular application. The microcontroller uses this data to control additional features as may be required for optimal germination such as heating element(s), cooling element(s), and lighting component(s) (not shown). It will be understood that any particular data link or device may be hard wired or wireless. When ready to transfer the germinated seeds to the planter, the operator starts the transfer cycle via user interface 4. The operator connects the outlet from solenoid valve 10 to a transfer canister, planter seed container, or directly to the singulating system as desired. Then the operator, via user interface 4, initiates the transfer and the microcontroller opens valve 10. As the seed and gel mixture transfers from the germination apparatus to the container or singulating system, the mixture preferably passes through a seed detection subsystem 12, which captures information about the mixture such as the number of seeds, spacing in the fluid, etc. It may in some cases also detect which seeds are germinated and which are not. Once all of the mixture is transferred, the microcontroller may close all valves and initiate a washing, rinsing and sterilizing process to prepare container 1 for the next batch.

Example

One germination system, suitable for pilot-scale work and for use on a small hobby farm or greenhouse operation operates with a batch of about 33 L of seed/hydrogel mixture. The operator will enter details about the batch to be created with a computer interface through a smartphone, tablet, or integrated control panel. Some characteristics of the batch may be obtained through a connection to a cloud-based resource on the internet. The operator may choose how many seeds to germinate, or may enter the acreage and crop to be planted and have the system calculate the number of seeds. Based on the crop chosen, the system will determine the appropriate process variables to maintain to complete optimal germination such as temperature, aeration, light requirements and stirring. An estimated date and time when the seeds will be ready to plant will be calculated. The system will consist of a tank into which the system will add the necessary amount of water to obtain the correct seed-fluid concentration. The user will add dry seeds to a bin on the system. The system controller will adjust the water temperature by applying heating or cooling as required. Once the optimal temperature is reached the system will then meter in the correct amount of seed either by count or weight. An agitation or stirring paddle or other device will then mix the seeds in the water to ensure they are all wetted. If required for the particular crop seeds, light and aeration will be started and maintained as needed. Each specific crop will have a set of control data that will be used to set and maintain these operating parameters. In the event that these parameters are not being maintained or other failures occur, the system will alert the operator via onboard indicators and annunciators, and preferably via messages to a smartphone, pager, or other personal digital assistant/device. During the germination process, the operator can open a sample hatch and dip out samples of seeds and liquid to review the progress. Once the batch is ready to be planted, the system will then add, on the operator's authorization, the appropriate amount of gelling powder to create the hydrogel mixture. A metering system of volume or weight will be used to add this powder.

The germinated seeds are suspended in a viscous fluid or hydrogel, rather than in pure water, for the following reasons. The hydrogel provides two primary benefits over using water alone. First, the gel provides some cushioning to the germinated seeds to protect the emerged radicle. If the radicle is damaged or destroyed, the seed will not be viable. Second, the hydrogel suspends the seeds such that they do not tend to sink in the fluid and clump together once mixed and separated. Many generally non-toxic organic and inorganic hydrogel-forming materials are well known in the industry. Examples of organic materials include agar, guar gum, xanthan gum, and polyethylene glycols of any selected molecular weight. Examples of inorganic materials include fumed silica, saponite clay (one preferred material is Laponite RD, a rheology additive based on synthetic clay, made by BYK USA Inc., Wallingford, CT 06492). The skilled artisan may select any suitable gelling agent through routine experimentation based on the particular application, type of seed, scale and cost factors, desired pH and osmotic pressure, desired viscosity and thixotropic properties, stability, etc.

One suitable hydrogel comprises Laponite RD mixed in water at a concentration of 1.5 to 2% by weight. This mixture is thixotropic with the characteristics shown in FIG. 2 [for background purposes, see Willenbacher, Norbert (1996), Unusual Thixotropic Properties of Aqueous Dispersions of Laponite RD. Journal of Collodial and Interface Science 182, 501-510, which is incorporated herein by reference in its entirety].

Example

The germination system described above may be used with seeds of tomatoes, peppers, seedless watermelons, lettuce, carrots, celery, and other vegetables typically planted as transplants. However, the system can be adapted to plant any plant seed for which a germinated seed provides value. Germinated seeds will be mixed into the hydrogel, preferably at a concentration of about 3 to 6 ml of fluid per seed. The overall batch volume will vary depending on the planting target and crop.

In many cases, Applicant prefers to add the viscosity-modifying component (e.g., Laponite) after germination has begun, because it is easier to observe the onset of germination in clear water. However, it will be appreciated that in some situations, for the convenience of users, seeds may be supplied premixed with a dry powder of gel-former and prepackaged in an amount intended to be mixed with a defined amount of water. Also, it may be advantageous to add gelling powder that aids in the germination of some seeds. Alternatively, a seed kit may include a premeasured package of seeds and a premeasured package of gelling agent, both corresponding to a predefined amount of water. In this way, a user combines the seed pack with the indicated amount of water, and after germination the user then adds the gelling agent The invention may further provide a method for transforming a random distribution of seeds in the gel mixture into a uniform distribution at an optimal spacing for plant growth.

Example

Transferring the seed-containing gel to the planting device may be done manually by pouring or ladling, or an outlet valve 10 may be provided to discharge the mixture into the planting device or a separate container.

Example

The germination system may capture data about the batch as the mixture is transferred for planting. The data may include seed count, flow characteristics of the fluid, seed spacing in the fluid and other characteristics as may be desired for the planter's operation. Such data may then be transferred to the planter to improve the operation of the planter. One preferred method for data transfer is to use the same application running on a mobile device to accept data from the microcontroller on the germinator and communicate it to the microcontroller on the planter. A second method may be to have the germination system connected to an application in the cloud and transfer data there. Then the planter or other consumers may retrieve this data from the cloud. This method will facilitate collecting multiple batches' data for further analysis to improve system performance. The data will be unique to a given batch of seeds and gel. Also, the data may be compared in near real-time to predefined standards to determine if there are any characteristics that may cause planting failures such as too low a seed count (indicating seeds left behind in the tank), too high velocity of flow (indicating gel is not mixed well), etc.

During the germination time period, the germination system may periodically route seed and water mixture past sensors and back into the tank to check characteristics such as seed count (a low count would indicate either poor metering initially, poor mixing in the water, or other problems). After mixing in the gel powder, this same routing and detection process can be used to do a quality control check of the batch before transfer to the planting system.

Example

Any captured data on batch characteristics may be transferred to a planting device as operational inputs.

Planting System

As previously noted, the planting system receives a batch of hydrogel-seed mixture from the germinating system and dispenses individual seeds at user-selected points in a growing environment. The planting system also preferably receives batch-specific data from the germinating system. Various aspects of the planting system are described in the following examples.

Example

Figure 4:
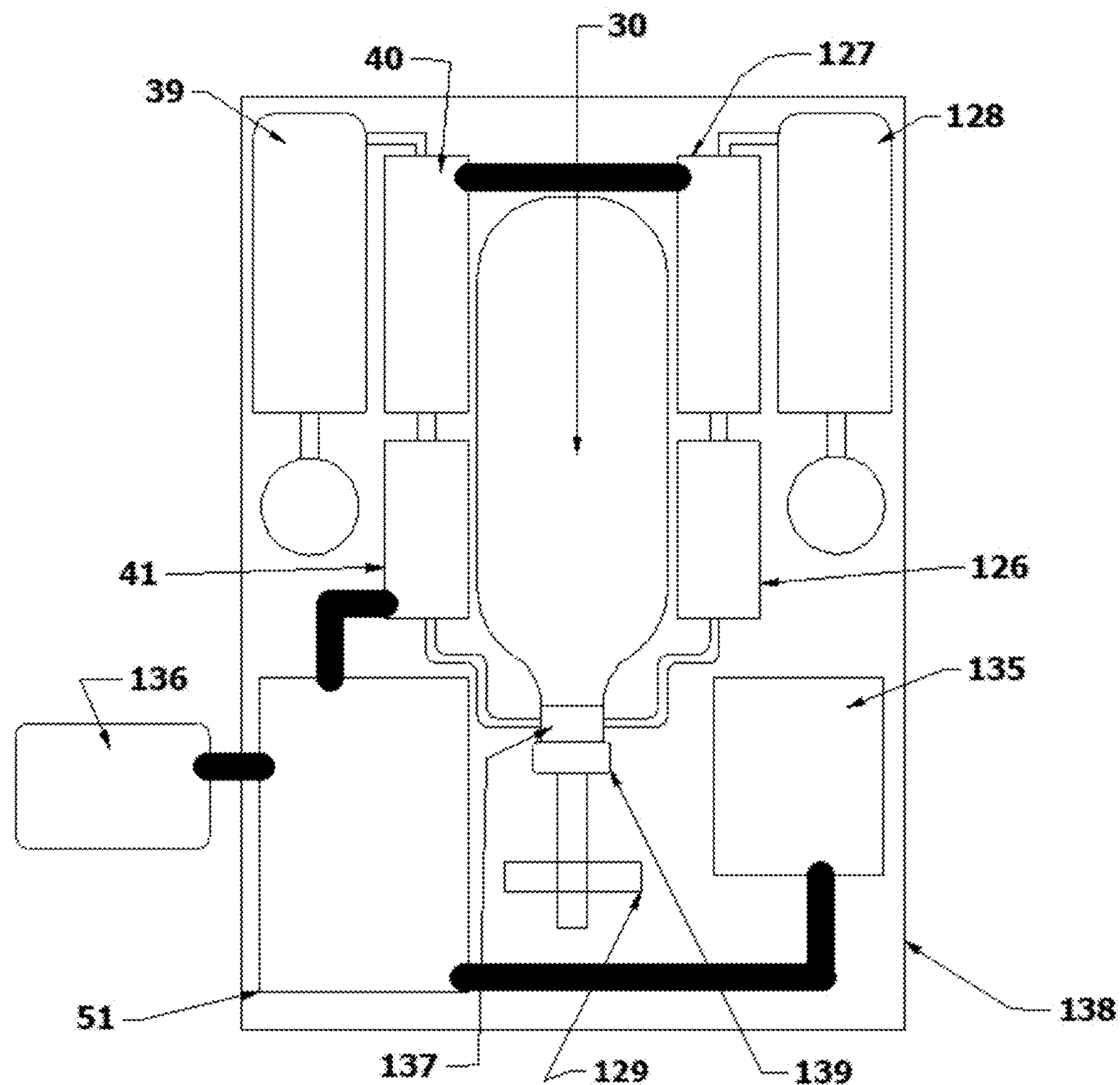
FIG. 4 is a schematic diagram of an exemplary backpack version of the inventive planter unit.

FIG. 4 shows schematically various components of a planting system. These components will be generally analogous regardless of how the planter will be deployed (man-portable, autonomous vehicle, or stationary systems). The skilled artisan may easily modify the size, shape, or other design features of one component to adapt it to its analogous component on another type of planter.

The planter system includes a tank 30, which may be the same volume as the tank on the germination system, or it may be some fraction thereof. The reason for this is because one batch of germinated seeds may be intended for a single day's planting, say, a 1-acre field, but the planting job might involve a number of individual workers, or a single worker who carries a small batch of seeds, plants those seeds, and refills the tank one or more times in the process of doing the entire day's planting campaign. The tank preferably has a sealable cover to keep out contaminants and to maintain a positive pressure as a means of driving the movement or dispensing of the seed mixture.

Example

Various data about the batch of gel-seed mixture may be captured during transfer from the germination system to the planter or planter tanks. The data may include the number of seeds transferred, statistical data about the spacing of the seeds such as actual spacing between seeds, maximum, minimum and average spacing, and other data as may be useful to the planter control algorithms. Further, data about the signals produced by the sensors as the seeds pass by during transfer may be shared with the planter. Such data may include features of the signals such as amplitude, period, duration, rise and return rates that may be advantageous for the planter to use during operation.

Example

Figure 2:
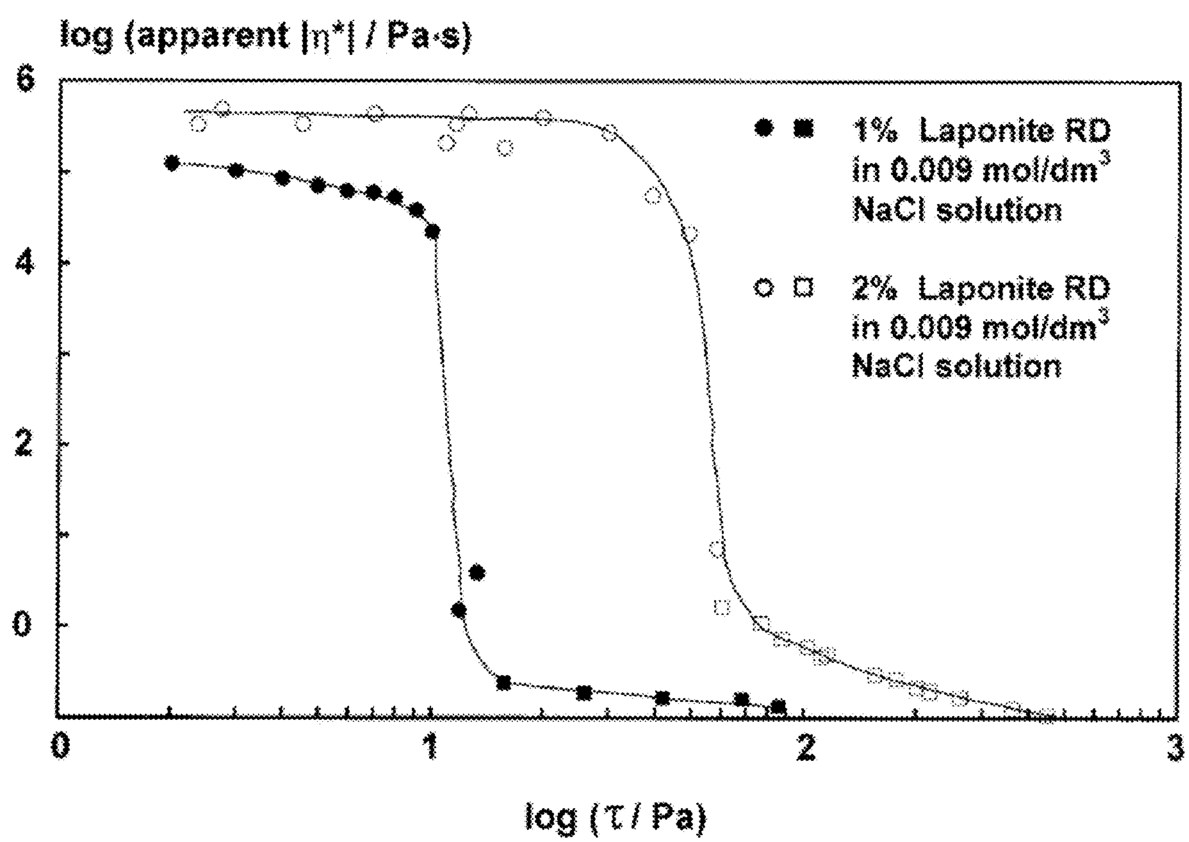
FIG. 2 is a graph of the viscosity profile of a thixotropic fluid, comprising aqueous suspensions of Laponite RD, which is one potential material for use in this invention.

The thixotropic gel's flow is controlled by levels of compressed air and vacuum that keep gel within the viscosity range approximating Newtonian behavior (i.e., the flow regime represented by the relatively flat upper part of the viscosity curves in FIG. 2). By applying compressed air, the gel is made to flow slowly and if it is necessary to stop the flow, the compressed air is stopped and a low level of vacuum is applied at a level such that the gel behaves as a fairly viscous Newtonian fluid.

Applicants have discovered, surprisingly, that the seed/hydrogel mixture, when not flowing, will stably support itself in an open tube whose inside diameter is significantly larger than the seed. In other words, a seed can be ejected from the planter outlet by pressurizing the line with compressed air, and then flow is halted by drawing a suitable vacuum. When the flow is stopped, the mixture is sufficiently viscous that air will not enter the end of the tube and allow the fluid to dribble out. Applicants confirmed this by testing the stability in vertical open ended tubes with diameters ranging from 0.25 to 1.5 inch and found that a suitable Laponite gel will stably remain in a tube up to 1.5 inch i.d. even when manually agitated up and down to simulate field conditions.

It will be appreciated that in many cases it is preferable to use the smallest diameter tubing that will accommodate the size of the selected seeds without clogging, because forcing the seeds to pass in single file through the tubing is the main driver of seed singulation. Furthermore, a smaller diameter will use less gel per seed or conversely, allow seeds to be spaced further apart for a given amount of gel.

The significance of this finding is that it allows all flow to be controlled by air pressure alone and eliminates any need for mechanical valves in the fluid line. It is well known that in traditional systems, any mechanical valves are prone to damaging the germinated seeds. One singulation system described by Searcy and Roth [see Trans. ASAE 1982:1563-66] used rotating disks with holes through which the fluid passed and flow was interrupted when the holes on adjacent disks were not aligned. Although the authors did not report any seed damage, their system required the continuous flow of fluid, either fluid with seeds or spare fluid from a second reservoir. They noted, "In order to retain the even spacing of seeds achieved by the metering mechanism, a continuous flow of gel was maintained to the furrow. An intermittent gel flow would have had the advantage of limiting gel needs but was not used due to the difficulty in controlling the quantity of gel being released at the end of the tube." Applicants' invention solves this problem, which is wasteful of material and severely limits the amount of seeds that can be carried because of the need for a second tank of fluid that has no seeds. The invention further eliminates any chance of seed damage from mechanical gates or valves.

Example

One suitable optical detection system uses a beam of light emitted from an LED that passes transversely in a narrow channel through transparent or near transparent glass or plastic tubing to a photodiode. When light strikes the photodiode, a current is produced. The photodiode is in series with a resistor and the voltage across the photodiode is measured by the analog to digital converter of the microcontroller. As gel-seed mixture flows through the tubing, the combination of the curvature of the tubing material and fluid serve to focus the light on the photodiode causing a proportional first voltage to be generated, which is measured by the analog-to-digital converter of the microcontroller. When a seed passes in the gel through the beam of light, the light is blocked and the voltage across the photodiode changes proportionally depending on the orientation of the seed in the tube. This causes a second voltage to be measured by the microcontroller. This change in voltage over time is analyzed and specific characteristics such as maximum amplitude and duration are used to confirm that the pulse was created by a seed passing through the light beam.

The signals produced as seeds and bubbles pass through the light beam of the detector system may have different characteristics. As seeds of a known type pass through the system and generate signals, the characteristics of these signals can be compared to known characteristics of signals produced by bubbles. When signals are similar to those of a bubble, the signal may be classified as a bubble. Further, multiple detectors may be oriented at different angles and in different planes relative to each other such that the integration of these signals may produce even more definitive differentiation between bubbles and seeds. For example, a disk-shaped seed may produce signals from different detectors that have different durations or amplitudes whereas a generally spherical bubble should produce similar signals from any direction. Or a bubble that is longer than the average seed size, will produce signals that are longer in duration or different in amplitude.

Example

An individual seed will flow with the thixotropic gel at near the same velocity of the carrier gel surrounding it. Further, seeds of a specific variety generally tend to have a consistent average size. As the seeds pass through a light beam, the signal produced will have a specific duration. The leading edge of this duration is the point in time when the seed initially blocks the light beam. The trailing edge of this signal is the point in time when the seed is no longer blocking the light beam. The total time to transit the light beam is proportional to the width of the light beam and the size of the seed. Therefore, an average instantaneous velocity can be calculated by dividing two times the average seed size by the pulse duration. This velocity can then be used to calculate the time to move the seed a discrete distance. So long as the discrete distance and the time lag between measuring the velocity and moving the seed are sufficiently small, the calculated velocity can be used to determine how long to flow the fluid to move the seed the required distance.

Example

Applicants recognized that there is a further need to determine if the fluid continues to flow, and for how long, during the intermittent applications of pressure and vacuum needed to dispense the seeds. This issue arises because of various factors related to using air pressure alone to move the fluid, stored energy and lag time when pressure changes, and other physical phenomena. Applicants have discovered, surprisingly, that a simple electrical measurement is reliably correlated to whether the fluid is moving or stationary.

Figure 11:
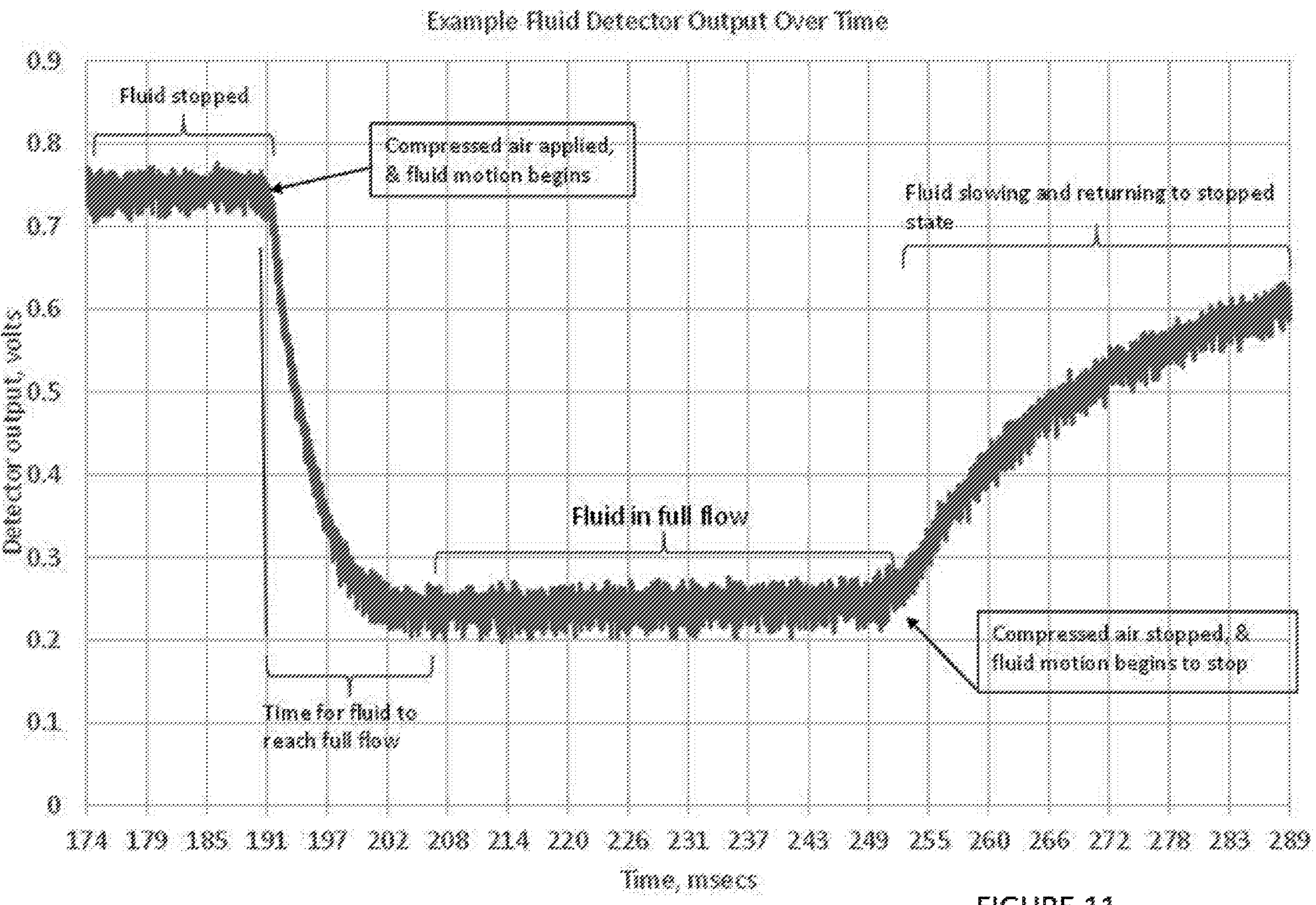
FIG. 11 is a graph of the signal from a fluid flow detector showing the response of the sensor when the fluid is at rest, starts flowing, reaches a steady flow state and then returns to a stopped state.
Figure 14:
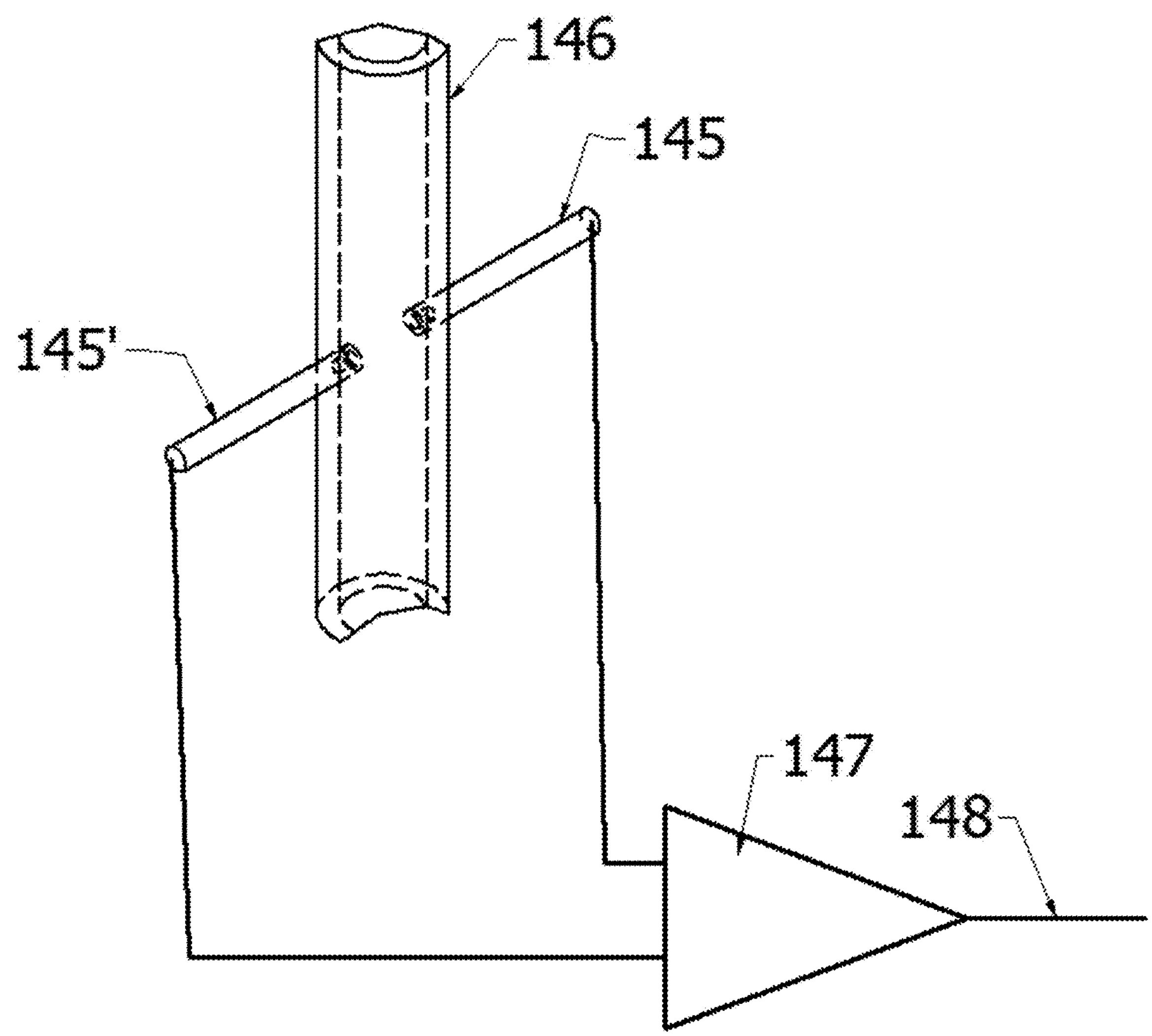
FIG. 14 is a schematic diagram of an electrical sensor to detect when a hydrogel is flowing or stationary in accordance with some aspects of the invention.

The fluid flow detection means, FIG. 14, consists of two conductive probes 145, 145' inserted into the side wall of the tubing 146, opposite one another and generally in the same plane. Each probe has a wire soldered to it that is then connected to the input of an op amp-based differential amplifier 147. Shielded cable may be used as necessary to reduce the pickup of ambient electrical noise. The amplifier's gain can be designed to match the varying requirements of the system. On the output line 148 signal amplitude generally ranges in the tens of millivolts, so some gain is useful. When compressed air is applied to the fluid, the sensor output voltage generally changes from stopped to full flow indication in under 100 milliseconds. FIG. 11 illustrates a typical signal using Laponite gel. This sensor is used in conjunction with the optical sensing apparatus to confirm fluid flow.

The exact mechanism for the observed electrical response is not completely understood. Applicants speculate that, as in most thixotropic fluids, upon setting there is some agglomeration or flocculation of the suspended particles. The concentration of particles in this suspension (a few wt. % clay particles in water) is well below the percolation threshold as long as the particles are well dispersed, and electrical conduction through the suspension is dominated by the conductivity of the water. But when the fluid stops moving, the particles might agglomerate to form small fibrils, providing higher conductivity paths through surface charge layers or other conductive species. When the fluid begins flowing again, the fibrils break and lower conductivity returns. But regardless of the exact mechanism or theory, the observed electrical sensor output has proven extraordinarily useful for controlling the system.

Example

Test results using the electrical sensor with exemplary organic and inorganic hydrogels indicate that Laponite RD produces a clearly detectable change in output when the fluid is stopped vs. when it is flowing. In contrast, inorganic hydrogels evaluated do not produce similarly high changes in output.

TABLE 1

Electrical response to flow conditions for selected organic and inorganic hydrogels.

| Gel former | Detector output, V, gel flowing | Detector output, V, gel stopped |
|---|---|---|
| Laponite RD 2 wt. % | 0.25 | 0.75 |
| Texturecel 40000 PA 2 wt. % | 0.15 | 0.14 |
| Texturecel 2000 PA 2 wt. % | 0.215 | 0.227 |

Applying machine learning algorithms to adapt to changing characteristics of the hydrogel-seed mixture and/or the external environment: The system can determine the near instantaneous velocity of the fluid moving with each seed and use this cumulative information to adjust its operation as required.

As previously noted, the planting system may be configured for several different operational scenarios, including a backpack system to be carried by a user, a system mounted on an autonomous vehicle traveling along a predetermined route in a field, and a stationary or bench system for planting seeds in growing trays in a greenhouse operation. These configurations will be described in the following examples.

Example

FIG. 4 shows one example of a man-portable "backpack" system that receives a batch of seed mixture and is carried into the field by a user, who manually dispenses individual seeds (each contained in a small volume of hydrogel) at selected locations along a planting row. This system comprises a frame 138, tanks 39, 128 for compressed air and vacuum, pumps and compressors for maintaining the compressed air and vacuum, pressure regulators 40, 127, solenoid valves 41, 126, battery power packs 135, electronic control systems 51, user interface 136, microcomputer 136, pressure sensors, a seed-gel mixture container 30, seed-gel container air adaptor 137, various conventional fittings, adaptors and mounting devices, tubing and wiring. It may also include an adjustable pole with a wheel on the end (not shown) that will touch the ground, and a seed detector module 129 near where the seeds and gel are dispensed. Heavy lines indicate cables carrying multiple conductors for data, control signals, power, etc.

Figure 5A:
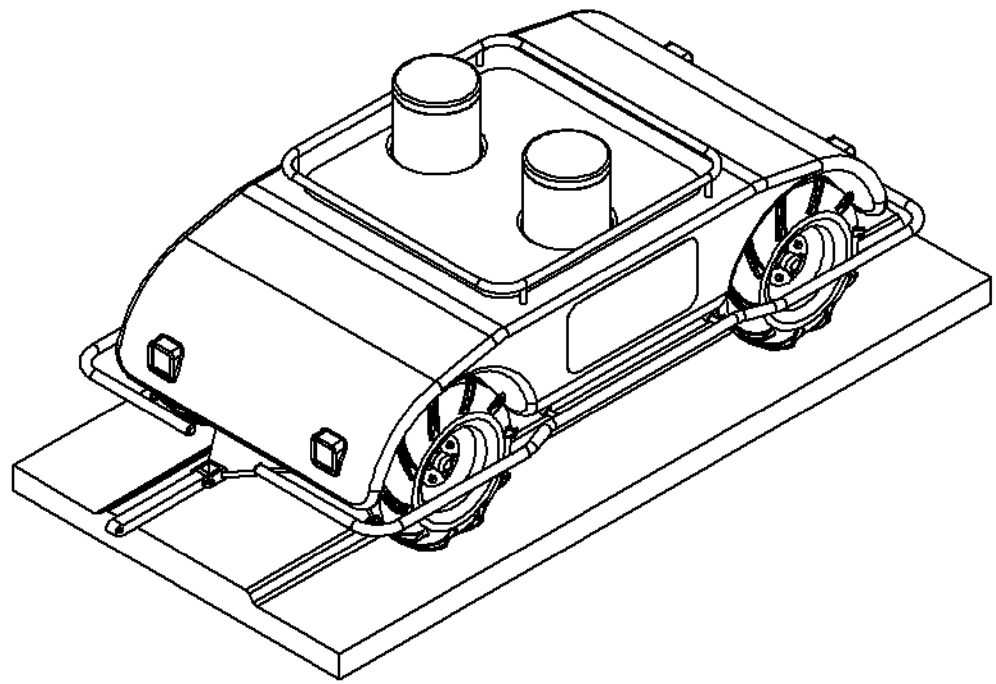
FIG. 5A-B illustrates schematically an autonomous version of the planter including the horizontal rotating tool carrier underneath the carriage.

FIG. 5A presents a simplified rendering of a planter on an autonomous vehicle that receives a batch of seed mixture and travels along a predetermined route in a field, dispensing individual seeds at selected locations. Similar to the backpack unit, the autonomous unit will include tanks for compressed air and vacuum, pumps and compressors for maintaining the compressed air and vacuum, pressure regulators, solenoid valves, battery power packs, electronic control systems, interface cabling to the prime mover, microcomputer, pressure sensors, a seed-gel mixture container, various fittings, adaptors and mounting devices, tubing and wiring. It will be on a wheeled carriage capable of straddling the planting area and will also preferably have devices to open a planting hole or furrow and covering it once the seed is planted and other tools and apparatus as may be advantageous to the system's operation.

Figure 5B:
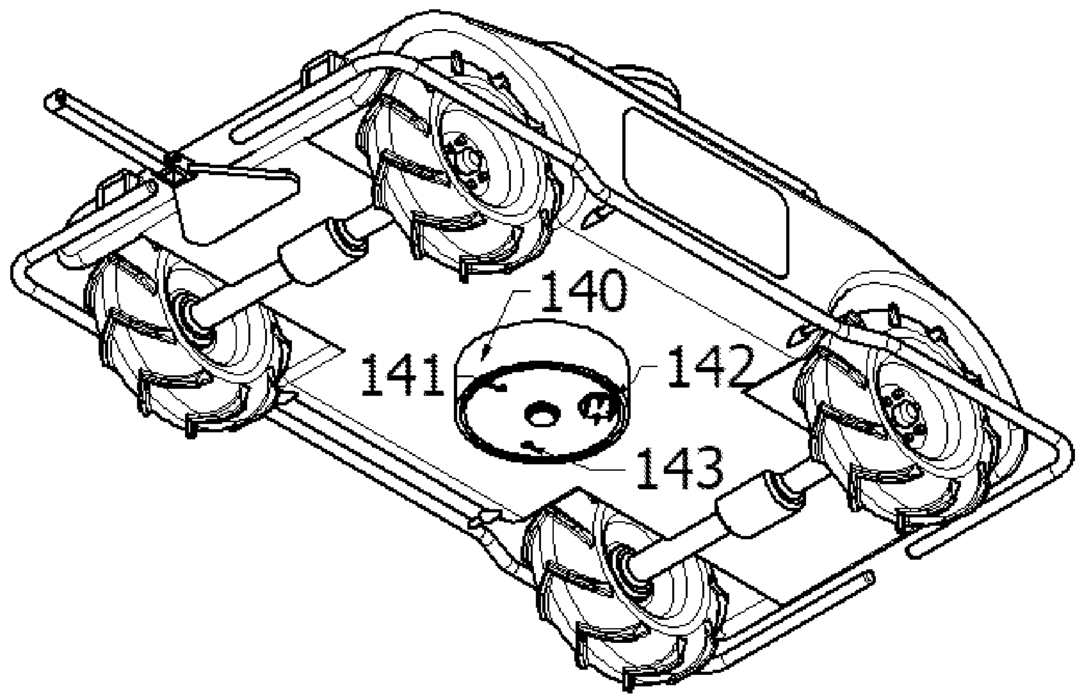
Figure 6:
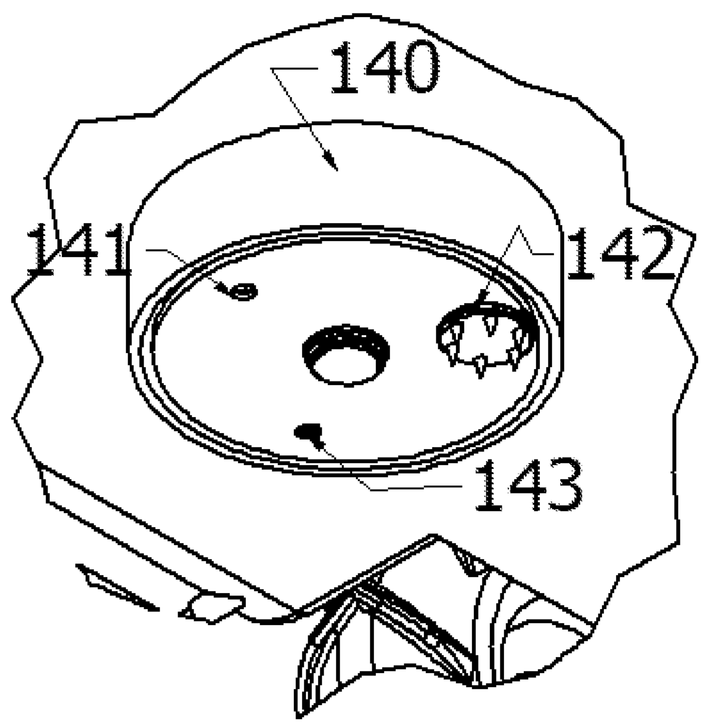
FIG. 6 illustrates schematically a rotating tool apparatus suitable for use with an autonomous version of the planter.

FIG. 5B shows a rendering of a rotating, horizontal tool carrier 140 mounted underneath the planter carriage. The tool carrier can have the capability to mount multiple tools 141, 142, 143 in multiple orientations to facilitate the planting or other field processes/needs, one example of which is shown schematically in FIG. 6. Here, as an example, the tools include a mulch cutter 142, spray orifice 143, etc.

Example

Figure 7:
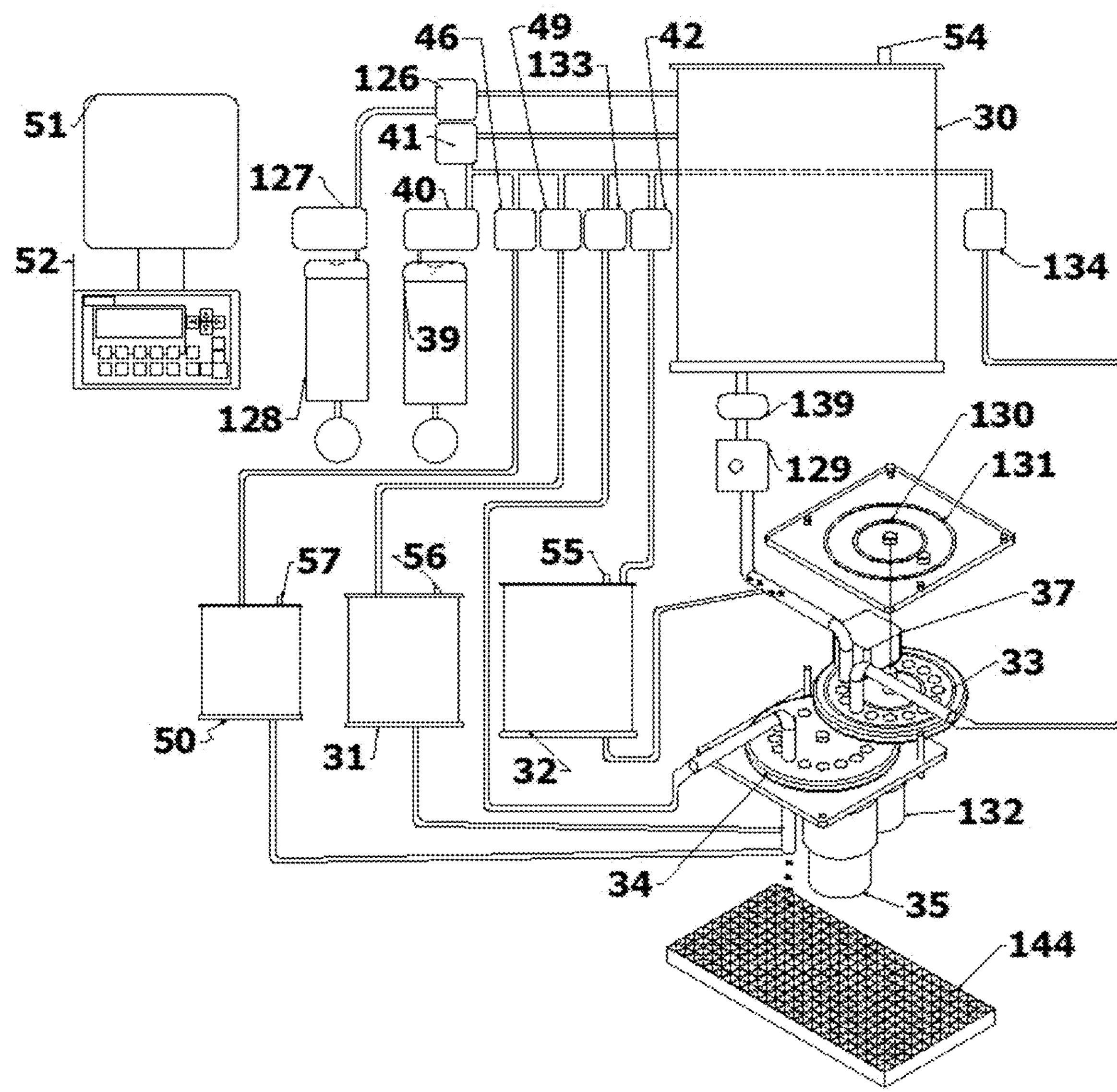
FIG. 7 is a schematic diagram of an exemplary version of the planter suitable for use in stationary planting situations such as greenhouses.
Figure 8A:
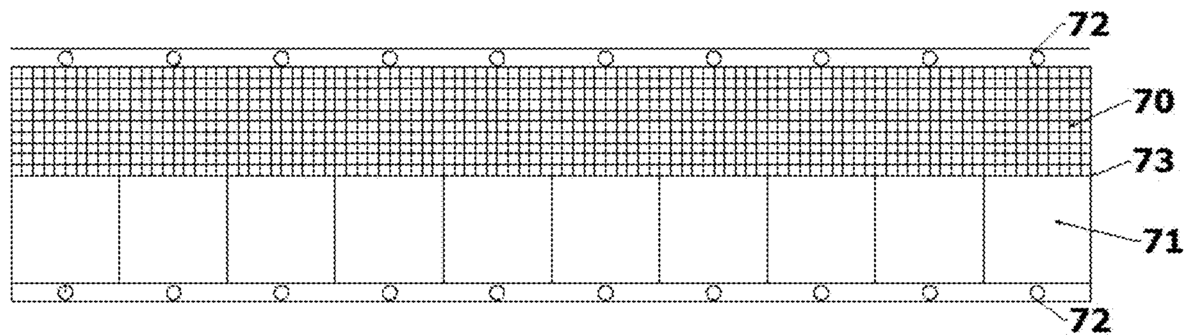
FIG. 8A-B are diagrams of an exemplary version of a method of packaging seeds and powder for germination into individual portions before germination in a system.
Figure 8B:
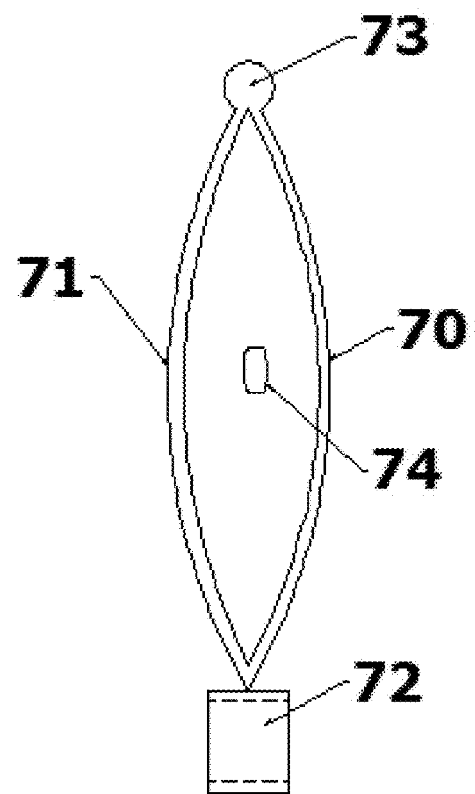
Figure 9:
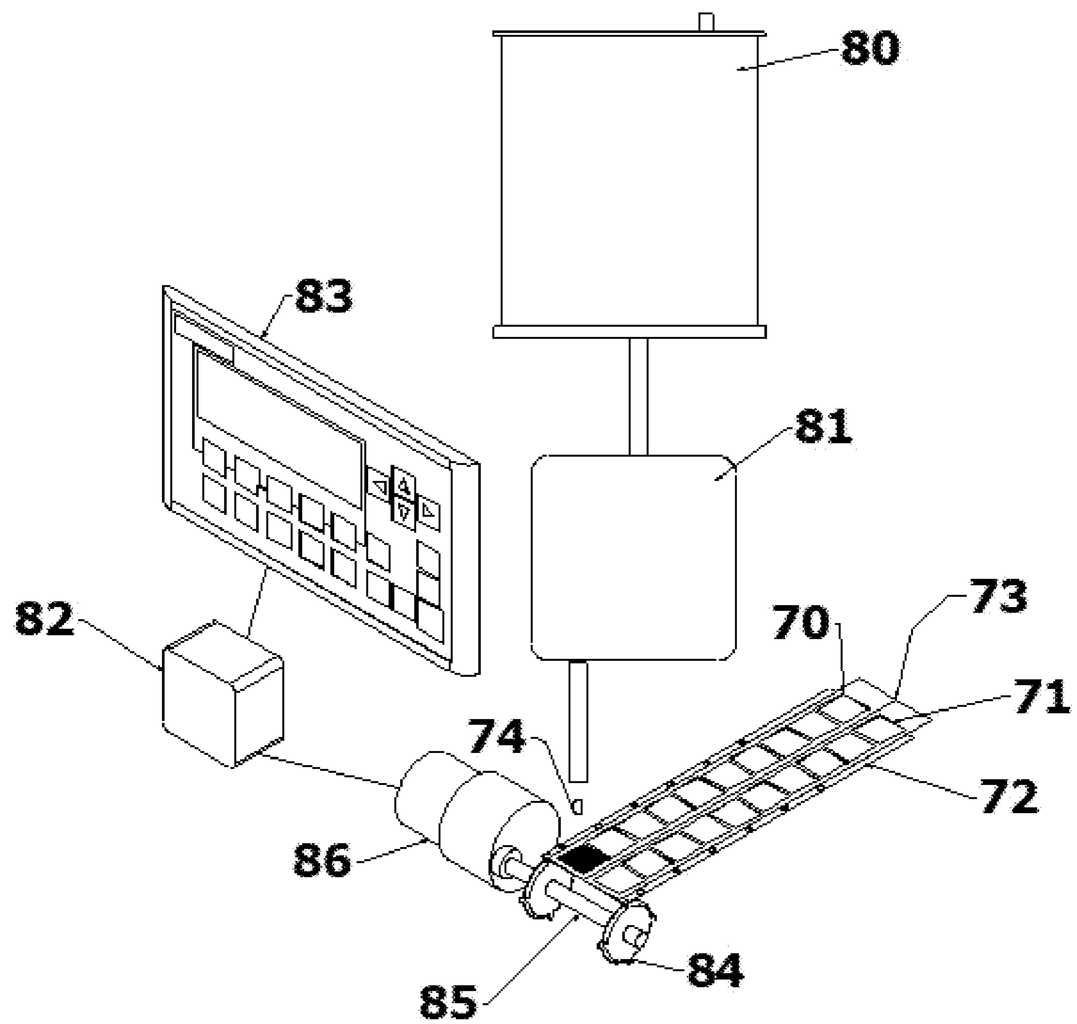
FIG. 9 is a diagram of an exemplary version of a method of inserting seeds into the packaging method diagrammed in FIGS. 8A and 8B.
Figure 10:
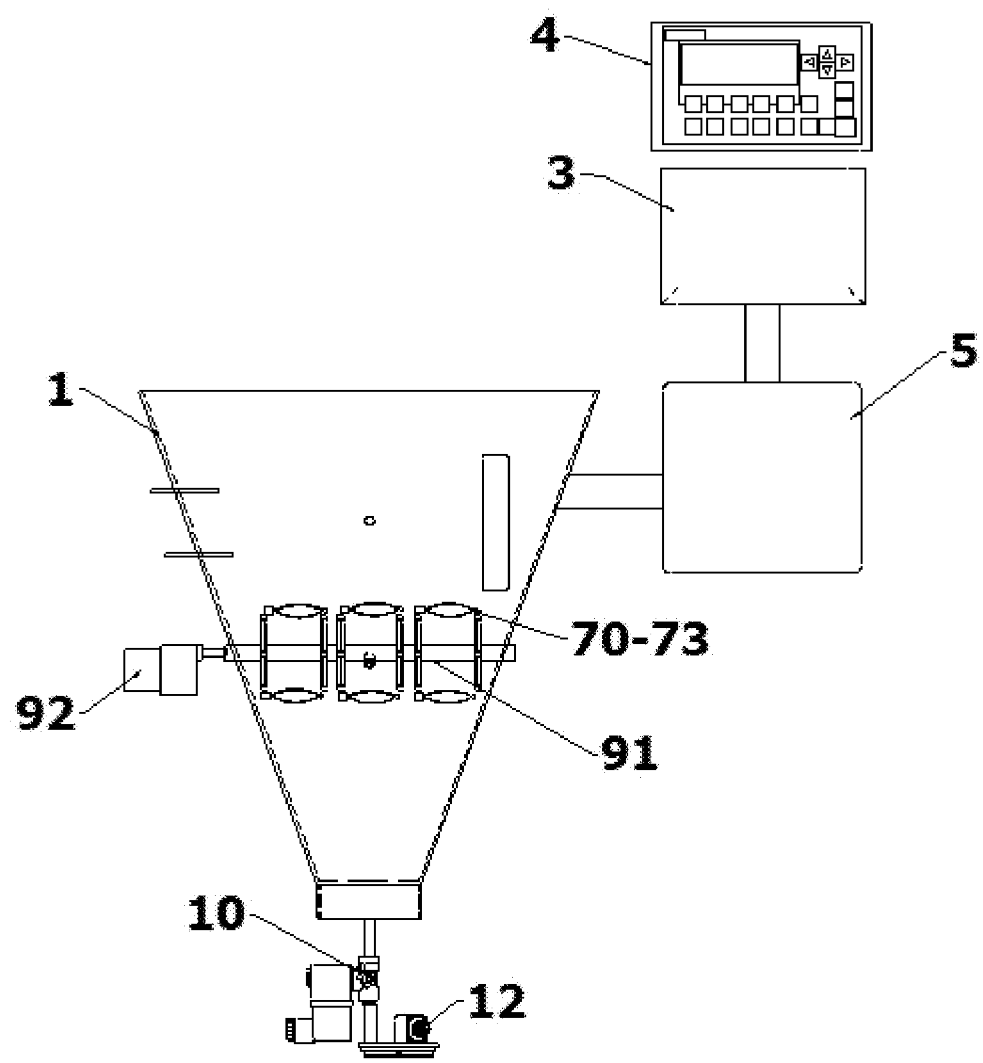
FIG. 10 is a schematic diagram of an exemplary version of a system for germinating individually packaged seeds and carrier material in a controlled environment to optimize germination.

FIG. 7 shows schematically a planter adapted to plant individual seeds in individual cells in a growing tray. This planter will be installed on a stand adjacent or attached to a device for filling trays, also known in the horticulture industry as flats or liners, with growing medium. The device will move the trays into position under the outlet of the singulation system such that a single cell in the tray will have the desired number of germinated seeds placed in each cell. The microcontroller 51 for the singulation system will interface with the controls for the tray handling and filling device so as to move each cell under the singulation system outlet.

Example

Figure 3:
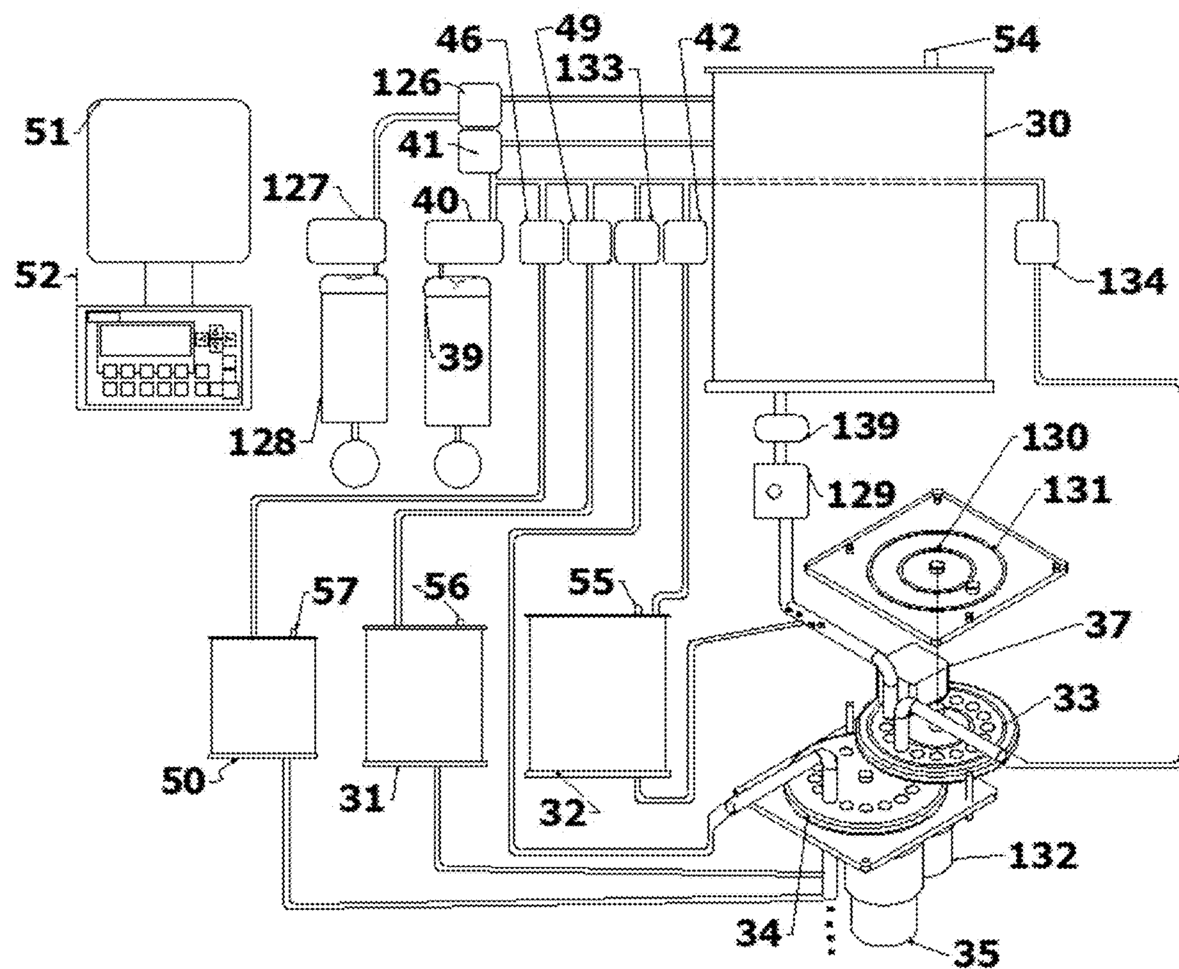
FIG. 3 is a schematic diagram of a seed singulation apparatus in accordance with other aspects of the invention.

As shown generally in FIG. 3, the gel-seed mixture is transferred into container 30 through a connection at port 54. Additional gel mixture without seed is transferred into the makeup gel container 32 through port 55. Container 31 is filled with water through port 56. Container 50 is filled with other additives or treatments such as fungicides and nutrients through port 57. The apparatus is mounted on a carrier (not shown) and aligned to the first planting location using the user interface 52. (The carrier may be any suitable prime mover, such as a tractor, robot arm, autonomous vehicle, drone, etc., depending on such factors as the size of the area to be planted, whether it is a field or greenhouse, etc.) Compressed air is sourced from either a tank or compressor 39 and vacuum is sourced from a tank or vacuum pump 128. Regulators 40 and 127 are set to the optimal process values for compressed air and vacuum respectively. The microcontroller 51 starts the process by operating valve 41 to pressurize container 30. This causes the gel-seed mixture to flow slowly. The gel-seed mixture flows past optical sensor 129 which outputs signals that are monitored and analyzed by microcontroller 51. The microcontroller 51 analyzes the signal from optical sensor 129 and makes a decision whether or not the signal was produced by a seed passing by. If the seed is too close to the previous seed, valve 42 may be opened to pressurize container 32 causing makeup gel to be inserted between the two seeds to increase the spacing. The microcontroller 51 controls the flow of gel-seed mixture by turning valve 41 on and off and can stop the forward flow of the mixture by turning compressed air off with valve 41 and applying vacuum by turning on valve 126. The microcontroller uses the signals associated with detection of a seed by sensor 129 to determine the approximate flow rate of the seed at that point and uses that information to move the seed into a cell in singulating plate 33 by continuing to control flow with compressed air and vacuum. When a seed is deposited into a cell in singulating plate 33, the controller 51 causes motor 132 to move plate 33 such that an empty cell is aligned with the tube. This causes the cell just filled to be moved through detector 37 which may be used to confirm the presence of a seed in the cell or measure other characteristics of the material in the cell as may be useful in the control process. The cell may also be filled with gel only if no seed has been detected. The microcontroller 51 records the contents of each cell in singulating plate 33 as it is filled and may update this record based on analysis of signals from detector 37. This record will be either that a seed is in the cell or no seed is in the cell. This process runs continuously as long as empty cells are available in singulating plate 33. The microcontroller aligns the end of the pipe/tube on singulating plate 33 with the closest empty cell in buffer plate 34 and operates valve 134 when there is a seed in the cell in plate 33 to deposit the seed with gel into the hole in buffer plate 34. Buffer plate 34 moves to align a cell with a seed over deposit tube outlet 45 and when the outlet tube is aligned with the planting location in the media, the microcontroller 51 operates valve 133 to release a short burst of compressed air to force the seed-gel mixture out of the cell in buffer plate 34. The mixture falls by gravity to the growing media. If no seed is in the cell in plate 33, compressed air is used to force that gel out of the cell at a location not over the target planting location. Alternatively, this fluid could be reclaimed with additional apparatus not shown. Valves 46 and 49 are operated by the microcontroller 51 to release water and other mixture into the deposit tube as needed/desired. If queuing disk 34 does not have a predetermined number of cells filled with seeds and gel, the microcontroller 51 will issue a wait signal to the prime mover to slow down or pause while the system fills more cells in buffer plate 34. Once the container 30 is empty, it can be refilled for another singulation or planting session or containers 30, 32, 31 and 50 can be filled with water and disinfectant and an automatic flush cycle can be in initiated using the user interface panel 52. Note that O-rings/gaskets 130 and 131 are in place in the housings for plates 33 and 34 to minimize the amount of seed-gel mixture that might escape during movement of the plates and that spacing and clearances of plates, gaskets, O-rings, and other such devices will be installed and configured to minimize any damage to the seeds . . . .

The apparatus provides a method for queuing such uniform distribution of seeds so that a germinated seed and transporting gel mixture is available at the planting location, and if they are not available, causing the prime mover of the planter to wait for the seed to be available.

Agricultural equipment traditionally moves at a constant rate across a field when performing tasks such as planting. This is because it is more efficient to keep the prime mover, whether animal or machine, moving at a near constant speed. In these situations, the implement, in this case a planter, must conform to the speed of the prime mover. However, the inventive planter departs from the usual practice, by preferably controlling the speed of the prime mover by communicating to the prime mover the speed that meets the planter's readiness to plant. This allows the implement, in this case a planter, to adjust the prime mover based on the implement's ability to perform its prescribed tasks effectively, rather than the other way around. For example, when the planter has a sufficient number of seeds in its seed buffer, it instructs the prime mover to move at the planter's maximum operating speed. When the planter seed buffer's fill level drops below some threshold, the planter will instruct the prime mover to slow down. This allows the planter more time to fill its buffer. And, if the planter seed buffer becomes completely empty, the planter will instruct the prime mover to stop until the buffer is full again.

It will be appreciated that this concept can be extended to many other implements, such as weeders, which are conventionally drawn at a constant speed and destroy the weeds as best they can at that speed, rather than controlling the prime mover when weeds become thicker or for some reason harder to treat properly. Variable rate spray equipment may vary the spray volume or pattern based on detection and patterns of weeds, but conventionally do not change the speed of the machine to do so. Tractor-drawn harvesting equipment, such as round forage balers, conventionally do not communicate actions to tractors, such as stopping to allow wrapping and ejecting of completing bales. The inventive concept may therefore be extended to all such related uses.

The apparatus may provide a method for controlling motion of the planting mechanism by connecting the microcontroller to the drive mechanism of the prime mover so that the mechanism can move at a varying speed that matches the availability of a germinated seed to be planted at the desired location. The prime mover may be further provided with any conventional means for determining its location, ground speed, or the like. Such means may include, e.g., GPS, ultrasonic triangulation, dead reckoning, video sensors, etc. Applicant contemplates that the planter may in many cases move autonomously during the planting process.

Example

The planter may control the forward speed in any number of ways. If it is drawn by a tractor, the device may signal the driver to slow or stop. Alternatively, the planter may communicate wirelessly or via cable to an on-board control device on the vehicle, which may intervene through a dedicated circuit, through an existing OBD port, or other suitable means to slow the vehicle, for example, by overriding the operator's throttle controls in a manner analogous to systems that automatically maintain a set following distance on the highway by overriding the throttle inputs.

The apparatus provides a method for loading a buffer of queued germinated seeds and gel mixture such that the prime mover can move as smoothly as possible across the planting zone but can pause as necessary to refill the buffer should it become empty below a defined threshold.

The apparatus may further employ additional data inputs (e.g., weather conditions, soil moisture, soil temperature, etc.) so as to manage the germination process for optimal timing of planting.

Example

A germination station may comprise a control panel or user interface 4 that the operator uses to select the crop type, acreage to be planted, desired planting date and other important data. Once startup data is entered, the control system 3 will determine when to start, perform readiness checks, and when such tests are passed begin the germination process by adding various materials and seeds, controlling flows, temperature, aeration, agitation and other physical actions as may be required by the germination process. The system may receive additional input from the operator to modify the germination process and will provide the operator with progress information throughout the process.

Once germination is completed, the system will add the gel forming component, mix, and alert the user.

The hydrogel/seed mixture may be transferred to the planter either by direct connection or by filling of canisters that are then loaded by the operator on to the planter.

When ready to plant, the operator takes the planter to the desired location and initiates the planting cycle. The planter executes a preparation cycle that singulates a buffer quantity of pre-germinated seeds. When ready it alerts the operator who then starts the machine in the field.

Containers may be metal (e.g., carbon steel, stainless steel, aluminum, etc.) or plastic (e.g., HDPE, LDPE, PTFE, etc.). Readily available plastic bottles (such as 2 liter soft drink bottles) using a standard thread may be quickly and easily obtained and reused for handling seed-gel mixture for the backpack system. Larger containers may be used for the autonomous unit.

The method will greatly reduce the amount of space and associated energy and water required to germinate seeds using existing greenhouse and indoor methods.

Example

When starting a crop from seed in a greenhouse, typically a 1.5 $ft^2$ tray may be used to start 72 seeds. These plants will stay in this space until moved to a less dense spacing several weeks after planting. So, to start approximately 5,000 seeds in a greenhouse, 104 $ft^2$ are used. After two weeks of growth, this space requirement could double. In contrast, the germination system may germinate the same number of seeds in an apparatus with a footprint of approximately 8 $ft^2$.

The inventive method will also reduce the time between successive plantings of crops by allowing seeds to be germinated in a compact space other than the normal field or indoor growing space. Furthermore, when combined with lightweight, autonomous planting systems, field planting can occur when conditions would not normally permit the use of heavier, traditional planting systems for dry seed that use planters and tractors. Applicants contemplate that autonomous planters will preferably be used to deliver germinated seeds and fluid into the soil or growing medium in larger planting situations such as field-level growing.

For autonomous planters, a companion nurse wagon apparatus may be used to transport multiple containers of seeds to the planting location. The planter and nurse wagon may cooperate autonomously to move canisters between the two devices.

Example

A typical tractor to draw a semi-automatic seedling transplanter can weigh as much as 8 tons and burn as much as 6 gallons of diesel fuel per hour. The inventive autonomous planter will preferably be all-electric and Applicants contemplate that a single row unit would weigh in the range of 1 ton fully loaded depending on the battery configuration and prime mover selected.

In indoor systems, robotic systems may used to deliver germinated seeds to flats, individual pots, or hydroponic growth systems.

General Process Description

The overall process flow may be summarized by the following steps:

1. Select crop and quantity to plant on the control panel or app.
2. Load seeds, gelling agent and other materials as may be needed into their appropriate bins.
3. Instruct the system to start the germination process.
4. Run system for programmed germination period, controlling temperature, agitation or mixing, and aeration.
5. Mix in gelling powder to form the gel.
6. Transfer germinated batch to planting system.
7. Transfer batch data to planting system as desired.
8. Operate planting system to deposit individual seeds, each in a small volume of hydrogel, at selected locations.

The seeds may be those of any selected plant, including vegetables, beans, grains, oil seeds, ornamentals, fibers (cotton, hemp, etc.), cannabis, and others.

The gelling agent may be any organic or inorganic material that, when mixed with water, forms a stable thixotropic mixture having rheological properties suitable for suspending seeds in a stable, pumpable slurry and optical properties that support detection of seeds in the material in flow.

The batch data may include date, time, seed type, variety, and any special data or instructions, such as customer data, lot number, etc.

The program control system may include any number of fixed cycles of temperature, time, mixing/aeration, etc., for specific seeds such as tomatoes, peppers, flower species, etc., and it may further allow a user to manually program a profile for some particular seeds being processed.

As the system is run for a programmed germination period, controlling temperature, agitation or mixing, and aeration, the system may further monitor for various off-normal conditions. These may include power failures, temperature excursions, or failure of any component or deviation from the programmed cycle.

The germinated batch may be transferred to a planting system in one complete batch, or some portion of the batch may be transferred, if, for instance, the receiving tank on the planting system is smaller than the tank on the germination system. So one "batch" in the germinator might represent several "batches" in the planter.

Selected batch data entered in, or detected, by the germinating system may be transferred to the planting system as desired. Such data may include: the number of seeds, spacing in the fluid, average velocity of the fluid, etc.

The planting system is operated to deposit individual seeds, each in a small volume of hydrogel, at selected locations. These locations may be rows in a traditional field, rows in a greenhouse or other covered structure, individual cells in growing trays, areas set aside for public beautification such as highway medians, rest areas, parkways, areas being reclaimed or restored, etc. For crops that do not require a specific spacing, such as grasses, the germinated seeds in the gel mixture could be sprayed across a prepared area such that growth would be accelerated in the area.

Various aspects and variations of the invention may include the following:

An apparatus for seed processing may comprise:

- a closed container containing a plurality of seeds spaced apart from one another in a seed germinating medium; and,
- a mechanical planting device to sequentially eject the spaced-apart seeds and seed germinating medium after germination so that each seed is deposited into soil at a selected location for further growth.

The container may generally tubular and at least partially transmissive to light. It may be permeable or semipermeable to oxygen and $CO_2$.

The container may be supported in a fixed position during germination so that all seeds in the container develop roots in a common direction under the influence of geotropism, enabling the container to be loaded into a mechanical planting device so that seeds are dispensed with the roots facing downward, although in many cases this may not be needed because the growing root on a misoriented seed will quickly change direction in response to gravity.

The seed germinating medium may comprise a viscous aqueous medium including a gel forming component in which:

- the gel forming component may be inorganic (clay, saponite, colloidal silica, etc.); or,
- the gel forming component may be organic (guar, xanthan, psillium fiber, methylcellulose, etc.); and,
- the aqueous medium may be thixotropic.

The seed germinating medium may be at least partially transmissive to light.

The mechanical planting device may comprise a seed detecting means to control the ejection process so that one seed is reliably ejected at each selected location.

The mechanical planting device may comprise a holder containing a plurality of containers and an indexing means to replace each emptied container with a filled container.

A method for seed processing may comprise the steps of:

- filling a container with seeds that are spaced apart from one another within a semi-fluid seed germinating medium;

placing the container in a thermal environment conducive to germination;

after the seeds have germinated, placing the seeds and seed germination medium in a mechanical planting device; and, using the mechanical planting device to sequentially eject the spaced-apart germinated seeds so that each seed is deposited into soil at a selected location for further growth.

Optional steps may include the following.

Seed germination medium may comprise a viscous hydrogel, which may be thixotropic.

Seed germination medium may be formed by placing spaced-apart seeds in a dry medium in a container, then adding water to combine with the dry medium and thereby form a viscous hydrogel.

Container and seed germinating medium may be at least partially transmissive to light, and the thermal environment may further contain a light source of a selected intensity and spectrum.

The container may be maintained in a controlled orientation during germination so that the roots of germinated seeds are pointing in substantially the same direction at the time of planting out.

The container may be placed into a mechanical planting device in a controlled orientation so that individual germinated seeds may be deposited into the soil with the root pointing downward.

A packaged seed product may comprise:

a selected quantity of seeds; and, a selected quantity of a gel-forming agent in dry powder form;

wherein the quantity of seeds and the quantity of gel-forming agent, when mixed with a selected quantity of water, will produce a stable, thixotropic hydrogel with an osmotic pressure suitable for the seeds to survive and germinate.

The seeds may be those of any selected plant, including vegetables, beans, grains, oil seeds, ornamentals, fibers (cotton, hemp, etc.), cannabis, and others.

The gel forming agent may be any organic or inorganic material that, when mixed with water, forms a stable thixotropic mixture having rheological properties suitable for suspending seeds in a stable, pumpable slurry.

The gel-forming agent may be selected from the group consisting of: organic materials including agar, guar gum, xanthan gum, polyethylene glycols of a selected molecular weight, and inorganic materials including fumed silica, natural or synthetic saponite clay, etc.

Figure 15:
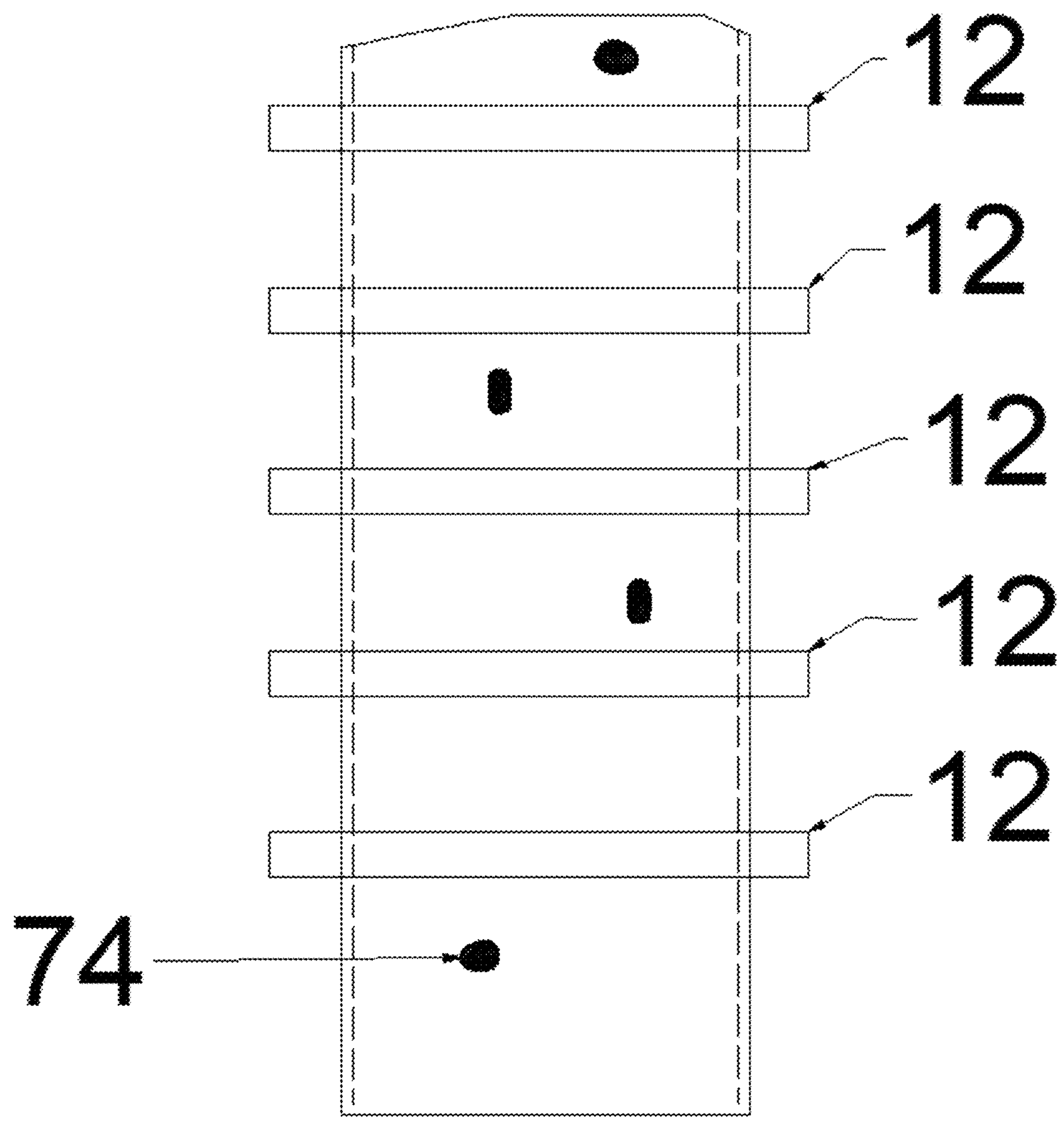
FIG. 15 is a schematic illustration of a virtual seed buffer using an array of optical detectors in accordance with some aspects of the invention.

As an alternative to the mechanical means of metering the germinated seed suspended in gel, a virtual buffer, FIG. 15, may be constructed using multiple seed detection sensors 12 arranged longitudinally at precise intervals on a conduit. Seeds 74 will pass by each sensor and data about their motion, size, and other characteristics as may be useful may be captured by a microcontroller and used to precisely extrude one and only one seed at a time from the conduit. The extruded seed may flow into the soil, a tray of soil or other container or apparatus as may be conducive to further growth of the plant.

I claim:

1. A seed planting apparatus comprising:

a container for holding a selected quantity of germinated seeds suspended in a thixotropic hydrogel fluid;

a source of compressed air;

a source of vacuum;

a fluid conduit through which said hydrogel fluid passes so that said seeds become singulated from one another within a fluid stream;

a first sensor to detect optically a passage of said singulated seeds within said fluid conduit;

a second sensor to detect electrically flow conditions within said fluid conduit;

an outlet though which said singulated seeds, each with a quantity of surrounding hydrogel fluid, are discharged at selected points in a planting medium;

a control system and power supply to control said sources of compressed air and vacuum, monitor outputs of said first and second sensors, and provide information to a user interface device;

a buffer device upstream of said outlet and having a plurality of chambers receiving said hydrogel fluid and controlled so that:

a chamber having a seed will be discharged into a next available planting location; and, a chamber containing only hydrogel fluid without a seed will be ignored so that each available planting location will receive a seed; and wherein: said control system receives data on a status of said buffer device and provides an output signal to slow a speed of forward progress of a planter if a number of seeds in the buffer device falls below a first selected value, and provides an output signal to increase a speed of forward progress of the planter when the buffer device has been reloaded to a second selected value.

2. The seed planting apparatus of claim 1 wherein said thixotropic hydrogel fluid comprises an aqueous suspension of inorganic particulates selected from a group consisting of: fumed silica, natural clay, synthetic saponite clay, and Laponite.

3. The seed planting apparatus of claim 1 wherein said source of compressed air and said source of vacuum comprise devices selected from a group consisting of: air compressors, air pumps, vacuum pumps, pressurized air tanks; pressure accumulators; gas conduits, solenoids, and valves.

4. The seed planting apparatus of claim 1 wherein said first sensor comprises a light source and a photodetector on opposite sides of said fluid conduit so that a seed passing within the conduit temporarily obscures the light source.

5. The seed planting apparatus of claim 1 wherein said second sensor detects whether said fluid is moving or stationary within said conduit by measuring an electrical property of said fluid that can be correlated to fluid movement.

6. The seed planting apparatus of claim 1 wherein said control system receives batch data from a germination device, said batch data corresponding to at least one characteristic of said selected quantity of germinated seeds.

7. The seed planting apparatus of claim 1 wherein said user interface device is hard wired to said control system.

8. The seed planting apparatus of claim 1 wherein:

said user interface device comprises a mobile device selected from a group consisting of: laptop computers, tablet computers, and smart phones; and, said control system communicates with said user interface device using any suitable wireless communication protocol.

9. A seed planting method comprising the steps of:

germinating a batch of seeds in water;

adding a gel forming agent to said water to form a thixotropic hydrogel suspension in which said germinated batch of seeds are suspended;

placing a selected quantity of the hydrogel suspension into a container;

providing a source of compressed air and a source of vacuum to alternately apply positive and negative pressure to said hydrogel suspension to cause said hydrogel suspension to flow intermittently through a fluid conduit of sufficiently small diameter so that said seeds become singulated from one another as said seeds flow through said fluid conduit;

using an optical detector to detect said singulated seeds as they pass through said fluid conduit;

using an electrical detector to detect onset and stoppage of said flowing hydrogel suspension;

discharging discrete volumes of said hydrogel suspension through an outlet at selected places in a planting area, each volume containing a single seed;

controlling said sources of compressed air and vacuum with a control system and power supply;

monitoring outputs of said optical detector and said electrical detector with the control system;

providing information to a user interface device from the control system;

receiving said singulated seeds upstream in a buffer device having a plurality of chambers;

controlling said buffer device so that:

a chamber having a seed will be discharged into a next available planting location; and, a chamber containing only hydrogel without a seed will be ignored so that each available planting location will receive a seed;

using said control system to receive data on a status of said buffer device;

using said control system to provide an output signal to slow a speed of forward progress of a planter if a number of seeds in the buffer device falls below a first selected value and provide an output signal to increase a speed of forward progress of the planter when the buffer device has been reloaded to a second selected value.

10. The method of claim 9 wherein said user interface is hard wired to said control system.

11. The method of claim 9 wherein said user interface comprises an application running on a mobile device and wirelessly communicating with said control system.

12. The method of claim 9 wherein said gel forming agent comprises an inorganic particulate selected from a group consisting of: fumed silica, natural clay, synthetic saponite clay, and Laponite.

13. The method of claim 12 wherein using an electrical detector comprises disposing electrodes on opposite walls of said conduit and connecting said electrodes to an amplifier circuit so that output voltage has a first value when said hydrogel is flowing and a second value when said hydrogel is at rest.

14. The method of claim 13 wherein said first and second values of said output voltage differ by at least 0.4 V.

* * * * *